(12) United States Patent
Sadiq et al.

(10) Patent No.: US 10,505,773 B2
(45) Date of Patent: Dec. 10, 2019

(54) ASSOCIATION BETWEEN SYNCHRONIZATION SIGNAL BEAMS AND REFERENCE SIGNAL BEAMS

(71) Applicant: QUALCOMM Incorporated, San Diego, CA (US)

(72) Inventors: Bilal Sadiq, Basking Ridge, NJ (US); Sundar Subramanian, Bridgewater, NJ (US); Tao Luo, San Diego, CA (US); Sumeeth Nagaraja, San Diego, CA (US); Juergen Cezanne, Ocean Township, NJ (US); Ashwin Sampath, Skillman, NJ (US); Navid Abedini, Raritan, NJ (US); Muhammad Nazmul Islam, Edison, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/871,734

(22) Filed: Jan. 15, 2018

(65) Prior Publication Data
US 2018/0205585 A1 Jul. 19, 2018

Related U.S. Application Data

(60) Provisional application No. 62/447,380, filed on Jan. 17, 2017.

(51) Int. Cl.
*H04L 27/26* (2006.01)
*H04L 5/00* (2006.01)
(Continued)

(52) U.S. Cl.
CPC ....... *H04L 27/2613* (2013.01); *H04B 7/0695* (2013.01); *H04B 7/088* (2013.01);
(Continued)

(58) Field of Classification Search
CPC . H04L 27/2613; H04L 5/0023; H04L 5/0048; H04L 27/2611; H04L 5/14;
(Continued)

(56) References Cited

U.S. PATENT DOCUMENTS 7,787,900 B1 * 8/2010 Raissinia ............. H04B 17/318
455/126
8,090,411 B2 * 1/2012 Korevaar ............... H01Q 19/08
455/10
(Continued)

FOREIGN PATENT DOCUMENTS

WO  WO-2015080645 A1  6/2015
WO  WO-2015133823 A1  9/2015
WO  WO-2016210302 A1  12/2016

OTHER PUBLICATIONS

International Search Report and Written Opinion—PCT/US2018/013831—ISA/EPO—dated Jul. 2, 2018.

*Primary Examiner* — Sharad Rampuria
(74) *Attorney, Agent, or Firm* — Holland & Hart LLP

(57) ABSTRACT

Methods, systems, and devices for wireless communication are described. Beams used for synchronization signals may be associated with beams used for reference signals. For example, a base station may identify a first set of millimeter wave (mmW) communication beams to transmit a synchronization signal. The base station may transmit the synchronization signal and identify a second set of mmW communication beams to transmit a reference signal, where the second set of mmW communication beams may be associated with the first set of beams. For instance, the first set and second set of mmW communication beams may be the same or similar. The base station may then transmit the reference signal on the second set of mmW communication beams. A user equipment may in turn identify the first and second sets
(Continued)

of beams as being associated, and receive the reference signal on the second set of mmW communication beams.

27 Claims, 18 Drawing Sheets

(51) Int. Cl.
*H04B 7/08* (2006.01)
*H04B 7/06* (2006.01)
*H04B 7/0408* (2017.01)
*H04L 5/14* (2006.01)

(52) U.S. Cl.
CPC .......... *H04L 5/0023* (2013.01); *H04L 5/0048* (2013.01); *H04L 27/2611* (2013.01); *H04B 7/0408* (2013.01); *H04L 5/001* (2013.01); *H04L 5/14* (2013.01)

(58) Field of Classification Search
CPC ....... H04L 5/001; H04B 7/088; H04B 7/0695; H04B 7/0408; H04B 7/2121; H04B 7/2123; H04J 2203/0069; H04Q 2213/394; H04W 72/04; H04W 72/12; H04W 76/00

See application file for complete search history.

(56) References Cited

U.S. PATENT DOCUMENTS

| | | | | |
|---|---|---|---|---|
| 10,171,216 | B2* | 1/2019 | Patel | H04W 72/04 |
| 10,218,785 | B2* | 2/2019 | Sun | H04L 67/1085 |
| 2015/0341877 | A1* | 11/2015 | Yi | H04W 56/00 |
| | | | | 370/350 |
| 2016/0345216 | A1 | 11/2016 | Kishiyama et al. | |
| 2017/0094624 | A1* | 3/2017 | Balachandran | H04W 56/00 |
| 2017/0353254 | A1* | 12/2017 | Islam | H01Q 3/2605 |
| 2018/0176065 | A1* | 6/2018 | Deng | H04B 7/0695 |
| 2018/0198659 | A1* | 7/2018 | Ko | H04L 5/005 |

* cited by examiner

ASSOCIATION BETWEEN SYNCHRONIZATION SIGNAL BEAMS AND REFERENCE SIGNAL BEAMS

CROSS REFERENCES

The present application for patent claims priority to U.S. Provisional Patent Application No. 62/447,380 by SADIQ, et al., entitled "Association Between Synchronization Signal Beams and Reference Signal Beams," filed Jan. 17, 2017, which is assigned to the assignee hereof and expressly incorporated by reference herein in its entirety.

BACKGROUND

The following relates generally to wireless communications, and more specifically to an association between synchronization signal beams and reference signal beams.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system, or a New Radio (NR) system). A wireless multiple-access communications system may include a number of base stations or access network nodes, each simultaneously supporting communication for multiple communication devices, which may be otherwise known as user equipment (UE).

In some wireless systems, devices (e.g., base stations, UEs) may communicate using directional transmissions (e.g., beams), in which beamforming techniques may be applied using one or more antenna elements to provide a beam in a particular direction. In such wireless systems, a UE may attempt to locate a suitable beam for communications with the base station, and may use various signals to identify the suitable beam. But the UE's transmission and reception of these signals on different beams may result in complex processes, excess power consumption, and latency at the UE.

SUMMARY

The described techniques relate to improved methods, systems, devices, or apparatuses that support an association between synchronization signal (SS) beams and reference signal (RS) beams. Generally, the described techniques provide for an association of one or more beams used for SSs with one or more beams used for RSs. For example, a base station in a millimeter wave (mmW) communications system may identify a first set of mmW communication beams used to transmit an SS to a wireless device (e.g., a user equipment (UE)). The base station may transmit the SS and identify a second set of beams for the transmission of an RS, where the second set of mmW communication beams are associated with the first set of mmW communication beams. For instance, the first set and the second set of mmW communication beams may be the same or similar to each other (e.g., the beams may have the same or similar parameters, including, for example, a transmit/receive angle, a beam width, and/or other parameters). In such cases, there may be a quasi co-location (QCL) relationship between the signals sent on the respective sets of beams. The base station may then transmit the RS on the second set of mmW communication beams.

A UE may in turn identify the first and second sets of beams as being associated based on the first set of mmW communication beams used for the reception of the SS, and the UE may receive the RS on the second set of mmW communication beams. In some examples, the UE may identify the association between the beams used for SSs and RSs based on predetermined relationships (e.g., QCL relationships) between the SSs and the RSs. Additionally or alternatively, the UE may identify the association using signaling received from the base station.

A method of wireless communications is described. The method may include identifying a first mmW communication beam set to transmit a SS to a wireless device, transmitting the SS using the identified first mmW communication beam set, identifying a second mmW communication beam set to transmit a RS, the second mmW communication beam set being associated with the first mmW communication beam set, and transmitting the RS using the identified second mmW communication beam set.

An apparatus for wireless communications is described. The apparatus may include means for identifying a first mmW communication beam set to transmit a SS to a wireless device, means for transmitting the SS using the identified first mmW communication beam set, means for identifying a second mmW communication beam set to transmit a RS, the second mmW communication beam set being associated with the first mmW communication beam set, and means for transmitting the RS using the identified second mmW communication beam set.

Another apparatus for wireless communications is described. The apparatus may include a processor, memory in electronic communication with the processor, and instructions stored in the memory. The instructions may be operable to cause the processor to identify a first mmW communication beam set to transmit a SS to a wireless device, transmit the SS using the identified first mmW communication beam set, identify a second mmW communication beam set to transmit a RS, the second mmW communication beam set being associated with the first mmW communication beam set, and transmit the RS using the identified second mmW communication beam set.

A non-transitory computer readable medium for wireless communications is described. The non-transitory computer-readable medium may include instructions operable to cause a processor to identify a first mmW communication beam set to transmit a SS to a wireless device, transmit the SS using the identified first mmW communication beam set, identify a second mmW communication beam set to transmit a RS, the second mmW communication beam set being associated with the first mmW communication beam set, and transmit the RS using the identified second mmW communication beam set.

In some examples of the method, apparatus, and non-transitory computer-readable medium described above, the second mmW communication beam set comprises the first mmW communication beam set. In some examples of the method, apparatus, and non-transitory computer-readable medium described above, the first mmW communication beam set includes a first parameter that may be within a predetermined range of a second parameter of the second mmW communication beam set. Some examples of the method, apparatus, and non-transitory computer-readable medium described above may further include processes, features, means, or instructions for determining that a transmit angle of at least some of the first mmW communication beam set may be similar to or identical to a transmit angle of at least some of the second mmW communication beam set.

Some examples of the method, apparatus, and non-transitory computer-readable medium described above may further include processes, features, means, or instructions for identifying a first antenna port set to transmit the SS. In some examples of the method, apparatus, and non-transitory computer-readable medium described above, identifying a second antenna port set to transmit the RS, the second antenna port set being QCL with the first antenna port set, wherein transmitting the RS using the identified second mmW communication beam set comprises: transmitting the RS using the second antenna port set.

Some examples of the method, apparatus, and non-transitory computer-readable medium described above may further include processes, features, means, or instructions for receiving, from a network entity, an indication of the second mmW communication beam set to transmit the RS, wherein identifying the second mmW communication beam set to transmit the RS may be based at least in part on the received indication.

Some examples of the method, apparatus, and non-transitory computer-readable medium described above may further include processes, features, means, or instructions for transmitting an indication of the second mmW communication beam set to the wireless device. In some examples of the method, apparatus, and non-transitory computer-readable medium described above, the first mmW communication beam set includes multiple mmW communication beams. In some examples of the method, apparatus, and non-transitory computer-readable medium described above, the second mmW communication beam set includes multiple mmW communication beams.

A method of wireless communications is described. The method may include identifying a first mmW communication beam set to receive a SS, identifying a second mmW communication beam set to receive a RS based at least in part on the identified first mmW communication beam set to receive the SS, the second mmW communication beam set being associated with the first mmW communication beam set, and receiving the RS using the identified second mmW communication beam set.

An apparatus for wireless communications is described. The apparatus may include means for identifying a first mmW communication beam set to receive a SS, means for identifying a second mmW communication beam set to receive a RS based at least in part on the identified first mmW communication beam set to receive the SS, the second mmW communication beam set being associated with the first mmW communication beam set, and means for receiving the RS using the identified second mmW communication beam set.

Another apparatus for wireless communications is described. The apparatus may include a processor, memory in electronic communication with the processor, and instructions stored in the memory. The instructions may be operable to cause the processor to identify a first mmW communication beam set to receive a SS, identify a second mmW communication beam set to receive a RS based at least in part on the identified first mmW communication beam set to receive the SS, the second mmW communication beam set being associated with the first mmW communication beam set, and receive the RS using the identified second mmW communication beam set.

A non-transitory computer readable medium for wireless communications is described. The non-transitory computer-readable medium may include instructions operable to cause a processor to identify a first mmW communication beam set to receive a SS, identify a second mmW communication beam set to receive a RS based at least in part on the identified first mmW communication beam set to receive the SS, the second mmW communication beam set being associated with the first mmW communication beam set, and receive the RS using the identified second mmW communication beam set.

Some examples of the method, apparatus, and non-transitory computer-readable medium described above may further include processes, features, means, or instructions for receiving the SS using the first mmW communication beam set. In some examples of the method, apparatus, and non-transitory computer-readable medium described above, identifying the first mmW communication beam set to receive the SS comprises: determining whether a received signal strength of the first mmW communication beam set satisfies a threshold, or whether a signal strength of the first mmW communication beam set may be greater than a signal strength of one or more candidate mmW communication beam sets, or a combination thereof.

In some examples of the method, apparatus, and non-transitory computer-readable medium described above, identifying the first mmW communication beam set to receive the SS comprises: selecting a subarray to receive the SS from a subarray set, the selecting being based at least in part on a signal strength of the SS. In some examples of the method, apparatus, and non-transitory computer-readable medium described above, identifying the second mmW communication beam set comprises: determining that one or more antenna ports corresponding to the RS may be QCL with one or more antenna ports corresponding to the SS.

In some examples of the method, apparatus, and non-transitory computer-readable medium described above, identifying the second mmW communication beam set comprises: determining that the second mmW communication beam set comprises the first mmW communication beam set. In some examples of the method, apparatus, and non-transitory computer-readable medium described above, identifying the second mmW communication beam set comprises: determining that the first mmW communication beam set includes a first parameter that may be within a predetermined range of a second parameter of the second mmW communication beam set.

Some examples of the method, apparatus, and non-transitory computer-readable medium described above may further include processes, features, means, or instructions for performing a beam refinement procedure based at least in part on the identified second mmW communication beam set. Some examples of the method, apparatus, and non-transitory computer-readable medium described above may further include processes, features, means, or instructions for receiving a subsequent SS or a subsequent RS based at least in part on the identified second mmW communication beam set and the beam refinement procedure.

DETAILED DESCRIPTION

Figure 1:
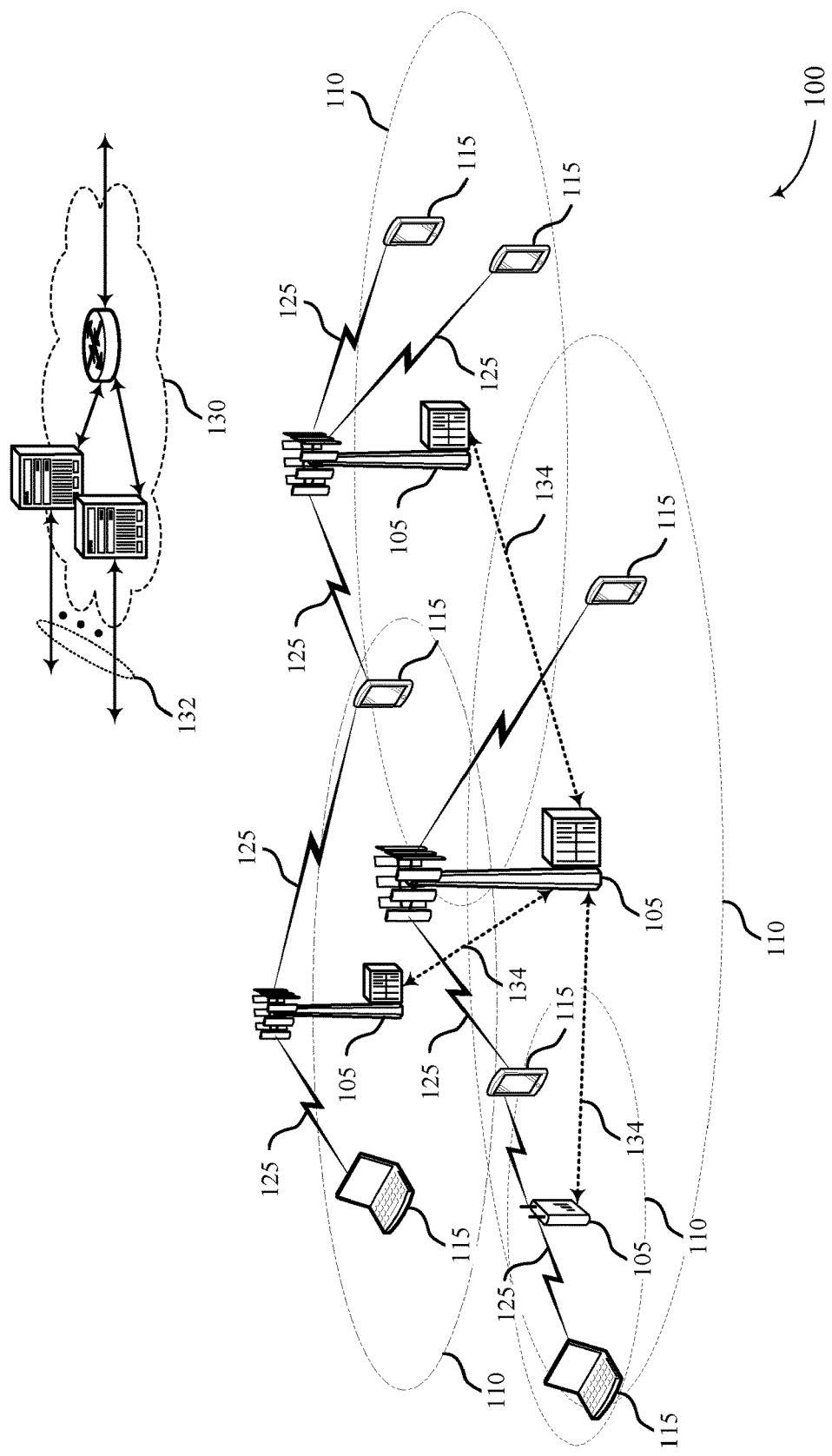
FIG. 1 illustrates an example of a system for wireless communications that supports association between synchronization signal (SS) beams and reference signal (RS) beams in accordance with aspects of the present disclosure.

Some wireless communication systems may operate in millimeter wave (mmW) frequency ranges, e.g., 28 gigahertz (GHz), 40 GHz, 60 GHz, etc. Wireless communication at these frequencies may be associated with increased signal attenuation (e.g., path loss), which may be influenced by various factors, such as temperature, barometric pressure, diffraction, etc. As a result, transmissions may be beamformed to overcome the path loss experienced at these frequencies. In some cases, a base station may transmit synchronization signals (SSs) (e.g., a primary synchronization signal (PSS), a secondary synchronization signal (SSS), and the like.) using multiple beams in a beam-sweeping manner through a cell coverage area. For example, PSS, SSS, and/or broadcast information (e.g., a physical broadcast channel (PBCH)) may be transmitted within different SS blocks on respective directional beams, where one or more SS blocks may be included within an SS burst. In some cases, these SSs and RSs may be transmitted at different times and/or using different beams.

In such systems, a user equipment (UE) may attempt to find a suitable receive beam corresponding to the beam on which the base station transmits a signal (such as an SS or an RS). The UE's attempt to find the suitable receive beam may include selecting an antenna module or subarray from a set of subarrays and forming multiple receive beams (e.g., through applying different phase shifts and beamforming weights). Such beam search processes may involve complexity, latency, and power consumption at the UE. According to described aspects, associating certain beamformed transmissions (e.g., RSs) from the base station to the beams or ports from which an earlier transmission (e.g., an SS) is transmitted provides benefits to beam search processes.

In some cases, a wireless communications system may enable techniques for the transmission and reception of RSs on sets of beams that are associated with beams used for the transmission and reception of SSs. For example, an association between a set of beams for RSs and a set of beams for SSs may correspond to the same or similar beam(s), or may correspond to quasi co-location (QCL) between antenna ports used for the transmission of SSs and RSs.

The association between the beams and corresponding signals may facilitate a more efficient search for, or more efficient refinement of, a suitable receive beam for the UE, enabling faster acquisition and reduced complexity. In the absence of the association between beams used for SSs and beams used for RSs described herein, the UE may have to perform a more thorough search for a suitable receive beam (e.g., searching for a suitable receive beam used for an RS may redundantly repeat a search that was already performed for the receive beam used for an SS), and the UE may thus be impacted by latency, power consumption, and complexity. The beamformed transmissions from the base station that may be associated with SSs may include RSs such as a demodulation reference signal (DMRS) (e.g., for a physical downlink control channel (PDCCH), or a physical downlink shared channel (PDSCH), etc.), a mobility reference signal (MRS), a channel state information reference signal (CSI-RS), a beam reference signal (BRS), and the like.

Aspects of the disclosure are initially described in the context of a wireless communications system. Aspects of the disclosure are further illustrated by and described with reference to apparatus diagrams, system diagrams, and flowcharts that relate to association between SS beams and RS beams.

FIG. 1 illustrates an example of a wireless communications system 100 that supports association between SS beams and RS beams in accordance with aspects of the present disclosure. The wireless communications system 100 includes base stations 105, UEs 115, and a core network 130. In some examples, the wireless communications system 100 may be a Long Term Evolution (LTE), LTE-Advanced (LTE-A) network, LTE-Advanced Pro network, or a New Radio (NR) network. In some cases, wireless communications system 100 may support enhanced broadband communications, ultra-reliable (i.e., mission critical) communications, low latency communications, and communications with low-cost and low-complexity devices. Wireless communications system 100 may support the use of associated beams for the transmission of SSs and RSs to enable UEs 115 to efficiently find a suitable beam for communications.

Base stations 105 may wirelessly communicate with UEs 115 via one or more base station antennas. Each base station 105 may provide communication coverage for a respective geographic coverage area 110. Communication links 125 shown in wireless communications system 100 may include uplink transmissions from a UE 115 to a base station 105, or downlink transmissions, from a base station 105 to a UE 115. Control information and data may be multiplexed on an uplink channel or on a downlink channel according to various techniques. For example, control information and data may be multiplexed on a downlink channel using time division multiplexing (TDM) techniques, frequency division multiplexing (FDM) techniques, or hybrid TDM-FDM techniques. In some examples, the control information transmitted during a transmission time interval (TTI) of a downlink channel may be distributed between different control regions in a cascaded manner (e.g., between a common control region and one or more UE-specific control regions).

UEs 115 may be dispersed throughout the wireless communications system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of things (IoT) device, an Internet of Everything (IoE) device, a machine type communication (MTC) device, an appliance, an automobile, or the like.

In some cases, a UE 115 may also be able to communicate directly with other UEs (e.g., using a peer-to-peer (P2P) or device-to-device (D2D) protocol). One or more of a group of UEs 115 utilizing D2D communications may be within the coverage area 110 of a cell. Other UEs 115 in such a group may be outside the coverage area 110 of a cell, or otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out independent of a base station 105.

A UE 115 attempting to access a wireless network may perform an initial cell search by detecting a PSS from a base station 105. The PSS may enable synchronization of slot timing and may indicate a physical layer identity value. The UE 115 may then receive an SSS. The SSS may enable radio frame synchronization, and may provide a cell identity value, which may be combined with the physical layer identity value to identify the cell. The SSS may also enable detection of a duplexing mode and a cyclic prefix length. Some systems, such as time division duplexing (TDD) systems, may transmit an SSS but not a PSS. Both the PSS and the SSS may be located in the central 62 and 72 subcarriers of a carrier, respectively. After receiving the PSS and SSS, the UE 115 may receive a master information block (MIB), which may be transmitted in the PBCH. The MIB may contain system bandwidth information, an SFN, and a physical hybrid automatic repeat request (HARD) indicator channel (PHICH) configuration. In some examples, the PSS, SSS, and PBCH may be transmitted together using time/frequency resources referred to as an SS block. After decoding the MIB, the UE 115 may receive one or more SIBs. For example, SIB1 may contain cell access parameters and scheduling information for other SIBss. SIB1 may be transmitted using a PDCCH in a common search space indicating resources for the SIB1 data fields in a corresponding PDSCH. Decoding SIB1 may enable the UE 115 to receive SIB2. SIB2 may contain radio resource control (RRC) configuration information related to random access channel (RACH) procedures, paging, a physical uplink control channel (PUCCH), a physical uplink shared channel (PUSCH), power control, a sounding reference signal (SRS), and cell barring.

Base stations 105 may communicate with the core network 130 and with one another. For example, base stations 105 may interface with the core network 130 through backhaul links 132 (e.g., S1). Base stations 105 may communicate with one another over backhaul links 134 (e.g., X2 or Xn) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as eNodeBs (eNBs) 105.

A base station 105 may be connected by an S1 interface to the core network 130. The core network may be an evolved packet core (EPC), which may include at least one mobility management entity (MME), at least one serving gateway (S-GW), and at least one packet data network (PDN) gateway (P-GW). The MME may be the control node that processes the signaling between the UE 115 and the EPC. All user Internet Protocol (IP) packets may be transferred through the S-GW, which itself may be connected to the P-GW. The P-GW may provide IP address allocation as well as other functions. The P-GW may be connected to the network operators IP services. The operators IP services may include the Internet, the Intranet, an IP Multimedia Subsystem (IMS), and a Packet-Switched (PS) Streaming Service.

The core network 130 may provide user authentication, access authorization, tracking, IP connectivity, and other access, routing, or mobility functions. At least some of the network devices, such as base station 105 may include subcomponents such as an access network entity, which may be an example of an access node controller (ANC). Each access network entity may communicate with a number of UEs 115 through a number of other access network transmission entities, each of which may be an example of a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate in an ultra high frequency (UHF) frequency region using frequency bands from 700 MHz to 2600 megahertz (MHz) (2.6 GHz), although in some cases wireless local area networks (WLANs) may use frequencies as high as 5 GHz. This region may also be known as the decimeter band, since the wavelengths range from approximately one decimeter to one meter in length. UHF waves may propagate mainly by line of sight, and may be blocked by buildings and environmental features. However, the waves may penetrate walls sufficiently to provide service to UEs 115 located indoors. Transmission of UHF waves is characterized by smaller antennas and shorter range (e.g., less than 100 kilometers (km)) compared to transmission using the smaller frequencies (and longer waves) of the high frequency (HF) or very high frequency (VHF) portion of the spectrum. In some cases, wireless communications system 100 may also utilize extremely high frequency (EHF) portions of the spectrum (e.g., from 30 GHz to 300 GHz). This region may also be known as the millimeter band, since the wavelengths range from approximately one millimeter to one centimeter in length. Thus, EHF antennas may be even smaller and more closely spaced than UHF antennas. In some cases, this may facilitate use of antenna arrays within a UE 115 (e.g., for directional beamforming). However, EHF transmissions may be subject to even greater atmospheric attenuation and shorter range than UHF transmissions.

Wireless communications system 100 may support mmW communications between UEs 115 and base stations 105. Devices operating in mmW or EHF bands may have multiple antennas to allow beamforming. That is, a base station 105 may use multiple antennas or antenna arrays to conduct beamforming operations for directional communications with a UE 115. Beamforming (which may also be referred to as spatial filtering or directional transmission) is a signal processing technique that may be used at a transmitter (e.g. a base station 105) to shape and/or steer an overall antenna beam in the direction of a target receiver (e.g. a UE 115). This may be achieved by combining elements in an antenna array in such a way that transmitted signals at particular angles experience constructive interference while others experience destructive interference.

Multiple-input multiple-output (MIMO) wireless systems use a transmission scheme between a transmitter (e.g. a base station 105) and a receiver (e.g. a UE 115), where both transmitter and receiver are equipped with multiple antennas. Some portions of wireless communications system 100 may use beamforming. For example, base station 105 may have an antenna array with a number of rows and columns of antenna ports that the base station 105 may use for beamforming in its communication with UE 115. Signals may be transmitted multiple times in different directions (e.g., each transmission may be beamformed differently). A mmW receiver (e.g., a UE 115) may try multiple beams (e.g., antenna subarrays) while receiving the SSs.

In some cases, the antennas of a base station 105 or UE 115 may be located within one or more antenna arrays, which may support beamforming or MIMO operation. One or more base station antennas or antenna arrays may be collocated at an antenna assembly, such as an antenna tower. In some cases, antennas or antenna arrays associated with a base station 105 may be located in diverse geographic locations. A base station 105 may multiple use antennas or antenna arrays to conduct beamforming operations for directional communications with a UE 115.

A base station 105 may insert periodic pilot symbols such as a cell-specific reference signal (CRS) to aid UEs 115 in channel estimation and coherent demodulation. CRS may include one of 504 different cell identities. The pilot symbols may be modulated using quadrature phase shift keying (QPSK) and power boosted (e.g., transmitted at 6 dB higher than the surrounding data elements) to make them resilient to noise and interference. CRS may be embedded in 4 to 16 resource elements in each resource block based on the number of antenna ports or layers (up to 4) of the receiving UEs 115. In addition to CRS, which may be utilized by all UEs 115 in the coverage area 110 of the base station 105, DMRS may be directed toward specific UEs 115 and may be transmitted only on resource blocks assigned to those UEs 115. DMRS may include signals on six resource elements in each resource block in which they are transmitted.

The DMRS for different antenna ports may each utilize the same six resource elements, and may be distinguished using different orthogonal cover codes (e.g., masking each signal with a different combination of 1 or −1 in different resource elements). In some cases, two sets of DMRS may be transmitted in adjoining resource elements. In some cases, additional RSs known as CSI-RS may be included to aid in generating channel state information (CSI). On the uplink, a UE 115 may transmit a combination of periodic SRS and uplink DMRS for link adaptation and demodulation, respectively. In some cases, other RSs may be used to track changes in channel conditions, or for tracking the mobility of various devices in wireless communications system 100. For instance, a phase tracking reference signal (PT-RS) may be transmitted to track phase changes in time to identify variations in phase noise. Additionally, an MRS may be used by a movable wireless device to identify candidate beams for use in communications. Other RSs not described herein may also be used.

A resource element may consist of one symbol period and one subcarrier (e.g., a 15 kilohertz (kHz) frequency range). A resource block may contain 12 consecutive subcarriers in the frequency domain and, for a normal cyclic prefix in each orthogonal frequency-division multiplexing (OFDM) symbol, 7 consecutive OFDM symbols in the time domain (1 slot), or 84 resource elements. The number of bits carried by each resource element may depend on the modulation scheme (the configuration of symbols that may be selected during each symbol period). Thus, the more resource blocks that a UE 115 receives and the higher the modulation scheme, the higher the data rate may be.

Wireless communications system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both frequency division duplexed (FDD) and TDD component carriers.

In some cases, wireless communications system 100 may utilize enhanced component carriers (eCCs). An eCC may be characterized by one or more features including: wider bandwidth, shorter symbol duration, shorter TTIs, and modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (where more than one operator is allowed to use the spectrum). An eCC characterized by wide bandwidth may include one or more segments that may be utilized by UEs 115 that are not capable of monitoring the whole bandwidth or prefer to use a limited bandwidth (e.g., to conserve power).

In some cases, an eCC may utilize a different symbol duration than other CCs, which may include use of a reduced symbol duration as compared with symbol durations of the other CCs. A shorter symbol duration may be associated with increased subcarrier spacing. A TTI in an eCC may consist of one or multiple symbols. In some cases, the TTI duration (that is, the number of symbols in a TTI) may be variable. In some cases, an eCC may utilize a different symbol duration than other CCs, which may include use of a reduced symbol duration as compared with symbol durations of the other CCs. A shorter symbol duration is associated with increased subcarrier spacing. A device, such as a UE 115 or base station 105, utilizing eCCs may transmit wideband signals (e.g., 20, 40, 60, 80 MHz) at reduced symbol durations (e.g., 16.67 microseconds (µs)).

In some cases, wireless communications system 100 may utilize both licensed and unlicensed radio frequency spectrum bands. For example, wireless communications system 100 may employ LTE License Assisted Access (LTE-LAA) or LTE Unlicensed (LTE U) radio access technology or NR technology in an unlicensed band such as the 5 GHz Industrial, Scientific, and Medical (ISM) band. When operating in unlicensed radio frequency spectrum bands, wireless devices such as base stations 105 and UEs 115 may employ listen-before-talk (LBT) procedures to ensure the channel is clear before transmitting data. In some cases, operations in unlicensed bands may be based on a carrier aggregation (CA) configuration in conjunction with component carriers (CCs) operating in a licensed band. Operations in unlicensed spectrum may include downlink transmissions, uplink transmissions, or both. Duplexing in unlicensed spectrum may be based on FDD, TDD, or a combination of both.

Wireless communications system 100 may use beams carrying SSs that are associated with beams carrying RSs. For example, a base station 105 in a wireless communications system 100 may identify a first set of mmW communication beams used to transmit an SS to a wireless device (e.g., a UE 115). The base station 105 may transmit the SS and identify a second set of beams for the transmission of an RS, where the second set of mmW communication beams may be associated with the first set of mmW communication beams. For example, the first set and the second set of mmW communication beams may be the same or similar to each other. The base station 105 may then transmit the RS on the second set of mmW communication beams. A UE 115 may in turn identify the first and second sets of beams as being associated based on the first set of mmW communication beams used for the reception of the SS, and the UE 115 may receive the RS on the second set of mmW communication beams.

Figure 2:
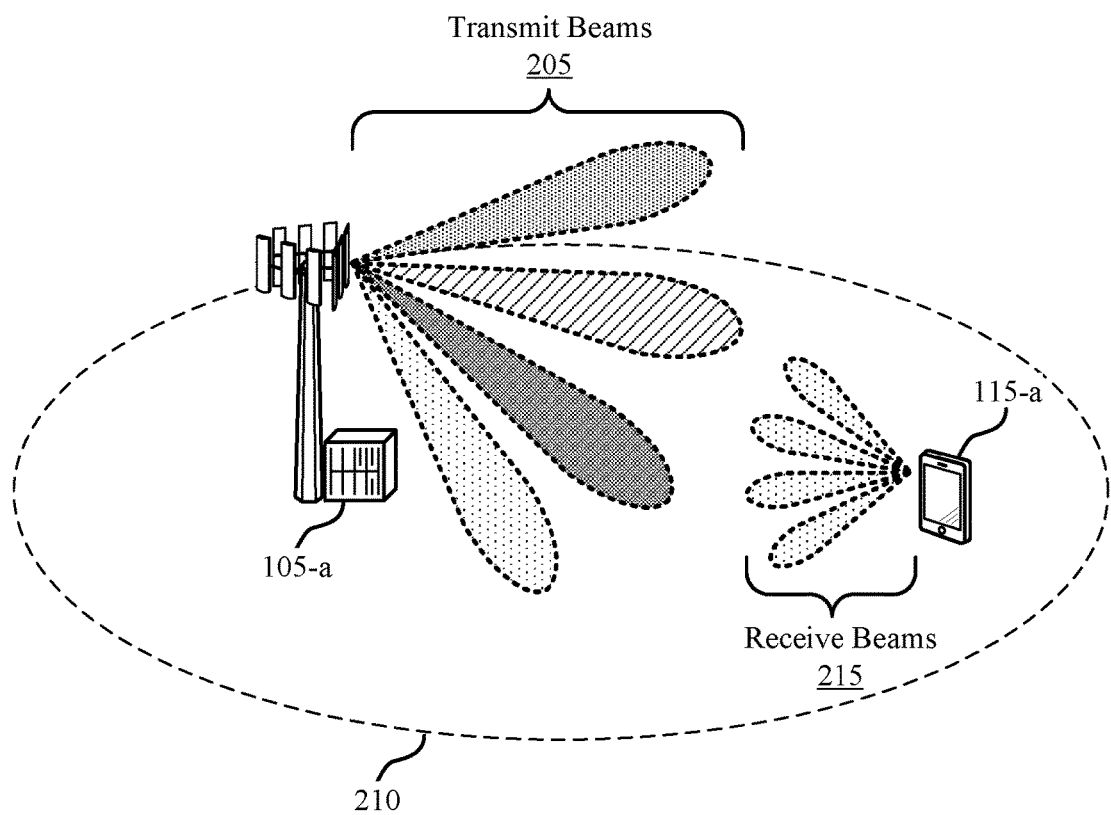
FIG. 2 illustrates an example of a wireless communications system that supports association between SS beams and RS beams in accordance with aspects of the present disclosure.

FIG. 2 illustrates an example of a wireless communications system 200 that supports association between SS beams and RS beams in accordance with aspects of the present disclosure. Wireless communications system 200 includes a base station 105-a and a UE 115-a, which may be examples of the corresponding devices described with reference to FIG. 1. Additionally, wireless communications system 200 may be an example of a system that supports high carrier frequencies (e.g., mmW frequencies) for communications between wireless devices. Wireless communications system 200 may illustrate a system that enables efficient searches for suitable beams, and subsequent beam refinement procedures, by a UE 115 through an association between beams used for SSs and beams used for RSs.

In wireless communications system 200, base station 105-a may transmit SSs (e.g., a PSS, an SSS) in a beam-sweeping manner (e.g., using one or more transmit beams 205) through a cell coverage area 210. For example, base station 105-a may transmit SS blocks in various directions using a respective transmit beam 205 for each direction. The beam-sweep may be associated with a number of antenna ports of base station 105-a through which an SS is transmitted over time in a beam-sweep epoch. For example, the beam-sweep epoch may correspond to beamsweeping operations in which base station 105-a transmits SS blocks in a sequence over a period of time. These SSs may be transmitted at different times (e.g., during respective symbol periods) and/or on different transmit beams 205.

UE 115-a may attempt to find a suitable receive beam 215 corresponding to the transmit beam 205 on which base station 105-a transmits a signal (such as an SS or an RS). The attempts by UE 115-a to find the suitable receive beam 215 may include selecting an antenna module or subarray from a set of subarrays, and the beam search may be a complex operation resulting in latency and power consumption at UE 115-a. For instance, UE 115-a may listen in multiple directions in an attempt to locate and identify a beam for communications (e.g., forming a beam pair between a transmit beam 205 and a receive beam 215). In other examples, UE 115-a may perform beam refinement procedures, where UE 115-a may first attempt to find a suitable beam for communications using a pseudo-omni receive beam (e.g., comprising multiple beams), and then further refine the beam by identifying one or more receive beams 215 having a strongest signal (i.e., a highest reference signal received power (RSRP) compared to other receive beams 215). Accordingly, to reduce the processes performed by UE 115-a to identify a suitable receive beam 215, it may be beneficial to associate certain beamformed transmissions (e.g., RSs) from base station 105-a to the transmit beams 205 or ports from which an SS is transmitted.

Wireless communications system 200 may enable techniques for the transmission and reception of RSs on sets of beams that are associated with beams used for the transmission and reception of SSs. For example, an association between a set of transmit beams 205 for RSs and a respective set of transmit beams 205 for SSs may correspond to the same or similar transmit beam(s) 205, or may correspond to a QCL relationship between antenna ports used for the transmission of SSs and RSs. Two antenna ports (or two sets of antenna ports) may be said to be QCL, spatially QCL, or have a QCL relationship if properties of the channel over which a symbol on one antenna port is conveyed can be inferred from the channel over which a symbol on the other antenna port is conveyed. For example, if a measured value for a parameter (e.g., delay spread, Doppler spread, Doppler shift, average delay, spatial parameters, etc.) of the channel for the one antenna port (or set of antenna ports) is within a threshold value of a measured value for the parameter of the channel for the second antenna port (or set of antenna ports), then the two antenna ports (or two sets of antenna ports) may be considered to be QCL. That is, if a first signal is transmitted utilizing a first antenna port that is QCL with a second antenna port that is utilized to transmit a second signal, then the first signal and the second signal may be communicated via the same transmit beam 205 and receive beam 215.

As a result, there may be a corresponding QCL relationship between signals transmitted by a wireless device using antenna ports that are QCL, and respective signals sent using such antenna ports may likewise be referred to as QCL. For instance, a QCL relationship may exist between respective SS blocks and RSs transmitted using different sets of antenna ports that are QCL. As an example of QCL-ed signals described herein, a QCL relationship may exist between an SS (an SS block) and an RS such as: DMRSs associated with PDCCH and PDSCH, including PDCCH and PDSCH for remaining minimum system information (RMSI) transmissions; a DMRS for RACH message (e.g., RACH message 2); a DMRS for a response to a beam failure recovery request, and the like. In other examples, there may be a QCL relationship between SS blocks and CSI-RS, where the CSI-RS may be used for various beam management procedures (e.g., beam acquisition, beam tracking, beam refinement, etc.) or CSI acquisition. Additionally or alternatively, the QCL relationship between the SS and the CSI-RS may be used for radio link monitoring (RLM) (where CSI-RS may be referred to as an RLM reference signal (RLM-RS)) or used for radio resource management (RRM) (where CSI-RS may be referred to as an RLM reference signal (RLM-RS)). CSI-RS may be referred to as a candidate-beam-RS and may be used for beam failure recovery (BFR) procedures. In any case, the QCL relationship between sets of antenna ports, and the corresponding QCL relationship between respective signals transmitted using such antenna ports, may enable a receiving wireless device to relate information between separate transmissions, thereby reducing complexity and power consumption when determining receive beams for wireless communications.

The association between the beams 205 and corresponding signals may facilitate a more efficient search by UE 115-a, or a refinement of a suitable receive beam 215 for UE 115-*a*, enabling faster acquisition and reduced complexity. The absence of the association between transmit beams 205 used for SSs and transmit beams 205 used for RSs, UE 115-*a* may be required to perform a more thorough search for a suitable receive beam 215, and may thus be impacted by latency, power consumption, and complexity. Thus, UE 115-*a* may use the QCL relationship between SSs and other signals to identify a beam for subsequent transmissions of the other signals without repeatedly searching for a suitable receive beam (i.e., the same beam may be used). The beamformed transmissions from base station 105-*a* that may be associated with the SS may include RSs such as a DMRS, an MRS, a CSI-RS, a BRS, etc.

In some cases, base station 105-*a* may use techniques for the association of transmit beams 205 used for SS transmissions and transmit beams 205 used for RS transmissions. For example, base station 105-*a* may determine one or more transmit beams 205 (e.g., a first mmW communication beam set including one or more transmit beams 205) on which to transmit an SS, and subsequently transmit the SS on the determined transmit beams 205. The base station 105-*a* may then determine one or more transmit beams 205 (e.g., a second mmW communication beam set including one or more transmit beams 205) that may be associated with the transmit beams 205 used to transmit the SS, and transmit an RS using the one or more associated transmit beams 205. The second mmW communication beam set may include the same transmit beam 205 or transmit beams 205 from the first mmW communication beam set used to transmit the SS, or a similar transmit beam 205 or transmit beams 205 from the first mmW communication beam set. In some cases, an associated transmit beam 205 may be a transmit beam 205 from one or more antenna ports used for transmitting the SS that is QCL with one or more antennas used for transmitting the RS.

The associated mmW communication beam sets (and corresponding signals) may be used to convey to UE 115-*a* that a receive beam 215 that UE 115-*a* has found for an SS may also be suitable for receiving an RS. For instance, the receive beam 215 used for receiving an SS block may indicate that the same receive beam 215 may be used to receive a subsequent RS. In some cases, two receive beams 215 may be considered similar if a receive or look angle of the receive beams 215 are close or identical (e.g., the transmit angle for transmit beams 205 is similar, and the receiving angle for receive beams 215, in turn, is also similar). That is, two transmit beams 205 or receive beams 215 may be similar if they have similar parameters (e.g., parameters within a range of each other), such as the transmit/receive angle (e.g., an angle within two degrees of each other, or a similar beam width, etc.).

In some examples, base station 105-*a* may transmit an indication of the transmit beam 205 or transmit beams 205 used for the RS transmission (e.g., an indication of mmW communication beams associated with SS transmissions), where the indication may, for example, be conveyed using system information, downlink control information (DCI), in an RRC configuration (e.g., sent via an RRC message), or a combination thereof. As an example, an RRC message may indicate one or more beams used for the transmission of an RS for a PDCCH relative to one or more SS blocks. Additionally or alternatively, DCI may further indicate which of the one or more beams are used for a PDSCH transmission such that UE 115-*a* may further identify the transmit beam 205 used for the PDSCH that is QCL with a transmit beam 205 used for the SS block. That is, a first indication of multiple associated transmit beams 205 used for PDCCH may be sent in an RRC message, and a second indication for an associated transmit beam 205 used for PDSCH may be sent in DCI (e.g., within the PDCCH). In such cases, the indication may comprise one or more bits of the DCI.

Additionally or alternatively, the indication may be based on a predefined configuration or procedures corresponding to the association between transmit beams 205 used for SSs and RSs. For example, a DMRS for certain PDCCH or PDSCH transmissions may be associated with a predefined configuration where the DMRS has a QCL relationship with SS block transmissions. Accordingly, UE 115-*a* may identify this predefined configuration and identify the receive beams 215 to use for reception of the DMRS. Base station 105-*a* may also receive an indication of the second mmW communication beam set to use from a network entity (e.g., a central entity that controls one or more base stations 105).

In one example, an SS may be transmitted from one logical antenna port including four physical antenna subarrays, where each subarray may contribute a transmit beam 205 to the transmission of the SS. The transmit beams 205 may, for example, each point in various directions (e.g., transmit beams 205 from a same subarray with two different polarizations may point in the same direction, whereas transmit beams 205 from different subarrays may point in different directions). Additionally, each subarray may transmit the same SS. Base station 105-*a* may then transmit an RS, and each antenna port may use the same transmit beam 205 or transmit beams 205 as was used for the transmission of the SS. That is, the RS transmission may be associated with a prior SS transmission. In some cases the RS transmitted may be different for each transmit beam 205. For example, a respective RS may be transmitted for each transmit beam 205, and the RS transmission may use a greater number of antenna ports than the SS transmission. However, as described above, the transmit beams 205 (and the parameters of the transmit beams 205) used for the RS may be the same or similar as the transmit beams 205 used for the SS transmission.

In some cases, UE 115-*a* may determine one or more receive beams 215 for receiving an SS. UE 115-*a* may then determine that an RS transmission is associated with the received SS, and may determine one or more receive beams 215 for receiving an RS based on the determined receive beams 215 used to receive the SS. In some cases, determining a receive beam 215 for the SS may include determining if a received signal strength of a selected receive beam 215 is greater than a threshold, or is stronger than that of other candidate receive beams 215. Determining the association may include determining that one or more antenna ports of the RS are QCL with one or more antenna ports of the SS. Additionally or alternatively, determining the association may include determining that one or more transmit beams 205 of the SS are the same as the one or more transmit beams 205 for the RS.

In some cases, determining receive beams 215 for the RS based on the transmit beams 205 used for the SS transmission may include using the same receive beams 215 for the RS at the receive beam 215 used for receiving the SS, or using other similar receive beams 215. In some examples, similar receive beams 215 may be used to find a refined receive beam 215, which may in turn be used for receiving subsequent SSs, or subsequent transmissions of the RS. In some cases, the RSs received on each of the associated receive beams 215 (e.g., the second mmW communication beam set that are associated with the first mmW communication beam set) may be different.

UE 115-*a* may identify a transmit beam 205 used for the SS transmission, and receive multiple RSs on an associated receive beam 215 or set of associated receive beams 215. That is, one SS may be received and UE 115-*a* may then identify an associated receive beam 215 (e.g., a similar or same receive beam 215) on which multiple RSs are received. Additionally or alternatively, various RSs may be received (such as DMRS, an MRS, and CSI-RS), and may be used, for example, in a beam refinement process (e.g., where UE 115-*a* may identify a different signal power for the various RSs).

Figure 3A:
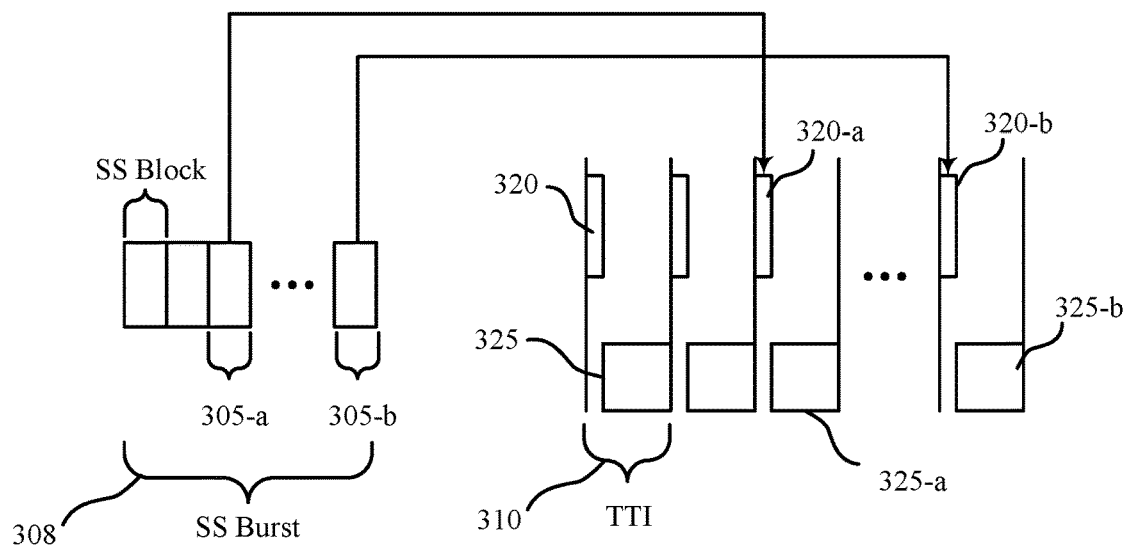
FIGS. 3A and 3B illustrate examples of SS and RS associations in a system that supports association between SS beams and RS beams in accordance with aspects of the present disclosure.
Figure 3B:
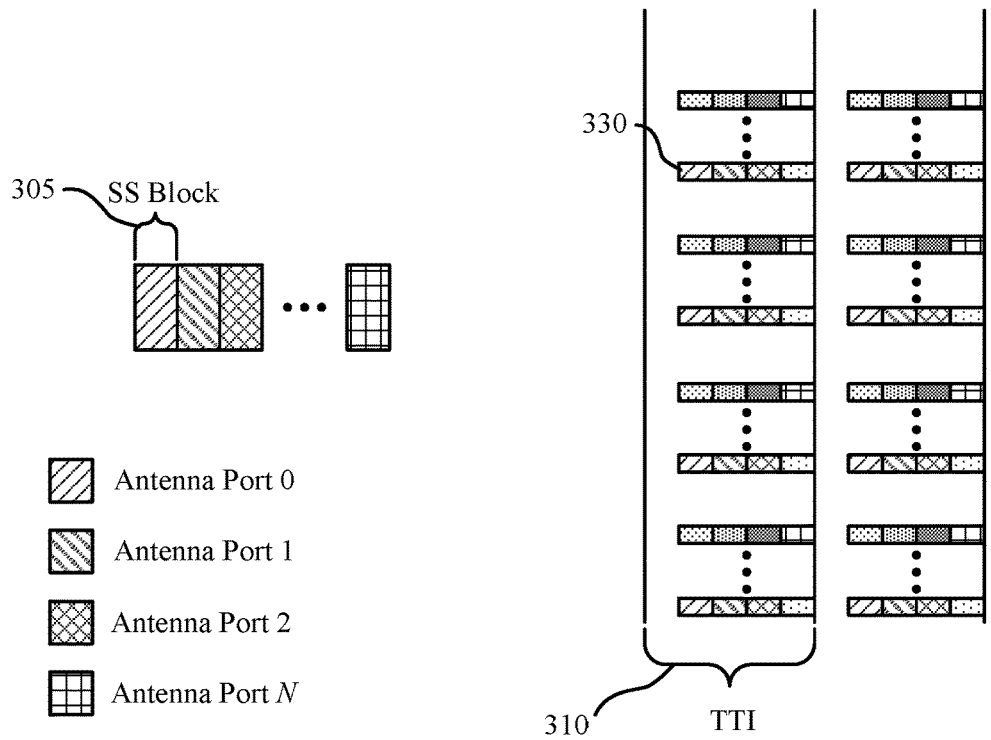

FIGS. 3A and 3B illustrate examples of SS and RS associations 301 and 302 in a system that supports association between SS beams and RS beams in accordance with aspects of the present disclosure. SS and RS associations 301 and 302 may be examples of SS blocks and RSs transmitted by a base station 105 using associated beams (e.g., using antenna ports that are QCL) and received by a UE 115. SS and RS association 301 may illustrate an association between an SS block 305 and a DMRS of a PDCCH 320 and/or between the SS block 305 and DMRS of a PDSCH 325. Additionally, SS and RS association 302 may illustrate an association between an SS block 305 and transmissions of CSI-RS 330.

As described above, respective transmissions of SS blocks 305 may be sent by a base station 105 using multiple transmit beams with each SS block 305 being transmitted on a different transmit beam at a different time. For example, each SS block 305 (e.g., within an SS burst 308) may include a PSS, SSS, and PBCH transmitted in different OFDM symbol periods. Using an associated beam, the base station 105 may transmit an RS that is QCL with the transmissions of the SS blocks 305. That is, the sets of antenna ports for the respective beams used to transmit the SS and the RS may be spatially QCL. The RS may be transmitted during a TTI 310 that corresponds to the SS block 305 (e.g., a subsequent OFDM symbol period), and the RS may be for control information (e.g., transmitted within PDCCH 320) or for data (e.g., transmitted within PDSCH 325) sent to a UE 115.

The RS that is associated with the SS block 305 may include a DMRS for a PDCCH 320 transmitted during a TTI 310, a DMRS for a PDSCH 325 transmitted during the TTI 310, or a combination thereof. For example, the base station 105 may transmit first and second SS blocks 305-*a*, 305-*b* using respective SS beams, and may subsequently transmit PDCCHs 320-*a* and 320-*b* (and a DMRS of the PDCCHs) using associated beams, where the first SS block 305-*a* and the DMRS of the PDCCH 320-*a* are transmitted using QCL beams and the second SS block 305-*b* and the DMRS of the PDCCH 320-*b* are transmitted using QCL beams. Similarly, DMRS in PDSCHs 325-*a* and 325-*b* may also be QCL to the respective SS blocks 305-*a* and 305-*b*. In some cases, the PDCCH 320-*a* may be an example of a common search space of PDCCH 320, and may be used to transmit RMSI including SIB1. UE 115 may identify the association between the first SS block 305-*a* and the DMRS of the PDCCH 320-*a* based on a predefined configuration (e.g., a one-to-one correspondence between an SS block index and an index of a common search space for PDCCH 320). In other examples, the base station 105 may transmit an indication of the beam used for the transmission of the DMRS of the PDCCH 320-*a*, thereby indicating the association between the first SS block 305-*a* and the DMRS of the PDCCH 320-*a*.

In other examples, and as illustrated in SS and RS associations 302, the RS that is associated with the SS block 305 may include a CSI-RS 330. In such cases, a base station 105 may transmit the SS blocks 305 via respective SS beams using a set of antenna ports, and the base station 105 may subsequently transmit CSI-RS 330 during one or more TTIs 310 on RS beams using a set of antenna ports that are associated (e.g., QCL) with the antenna ports used to transmit the SS blocks. That is, the respective antenna ports (or sets of antenna ports) for transmitting SS block 305*s* may be the same or similar to the antenna ports for transmitting CSI-RS 330. For instance, a first antenna port (e.g., antenna port 0) used for the transmission of an SS block 305 may be QCL with the antenna port used to transmit a CSI-RS 330, and the SS block 305 and the CSI-RS 330 may thus also be QCL. The QCL relationship between CSI-RSs 330 and SS blocks 305 may be given by a correspondence between an SS block index and a CSI-RS index. CSI-RS 330 may be transmitted within each TTI 310, or a first set of CSI-RS 330 (corresponding to a first subset of SS blocks 305) may be transmitted within one TTI 310, and a second set of CSI-RS 330 may be transmitted in one or more additional TTIs 310 (the set of CSI-RS 330 may be spread across multiple TTIs 310). In some examples, the antenna ports for CSI-RS 330 may correspond to a subset of SS blocks 305, and the subset may be indicated in signaling from the base station 105 (e.g., in a SIB or RRC signaling, etc.).

Figure 4:
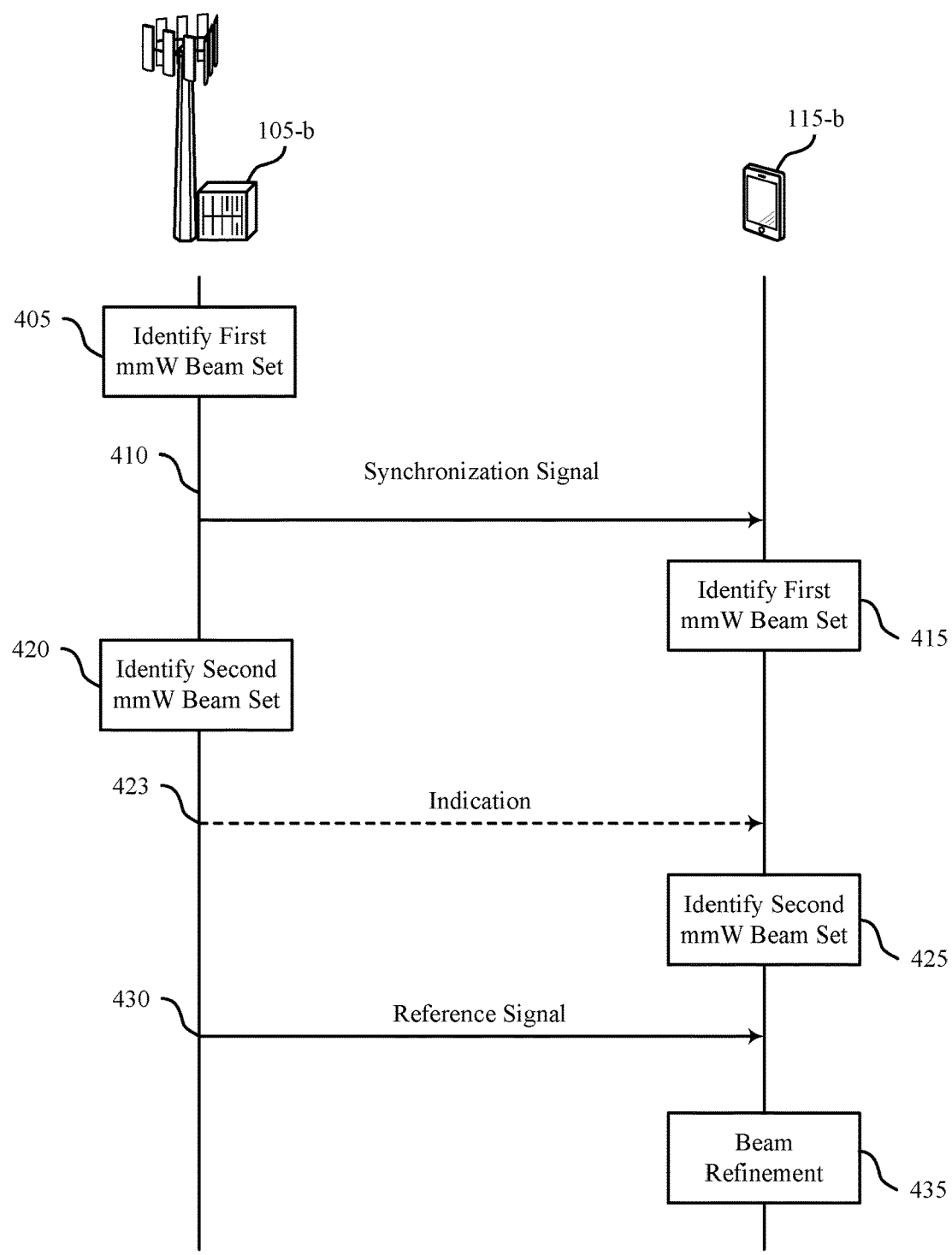
FIG. 4 illustrates an example of a process flow in a system that supports association between SS beams and RS beams in accordance with aspects of the present disclosure.

FIG. 4 illustrates an example of a process flow 400 in a system that supports association between SS beams and RS beams in accordance with aspects of the present disclosure. Process flow 400 includes a base station 105-*b* and a UE 115-*b* that may be examples of the corresponding devices described with reference to FIGS. 1 and 2. Process flow 400 may illustrate a beam or beams used for the transmission of RSs that is associated with a beam or beams used for the transmission of SSs.

At 405, base station 105-*b* may identify a first mmW communication beam set to transmit an SS to a wireless device (e.g., UE 115-*b*). The first mmW communication beam set may include multiple beams. For example, base station 105-*b* may identify up to 64 different beams within the first mmW communication beam set, and may select up to 64 mmW communication beams for the transmission of the SS. At 410, base station 105-*b* may transmit the SS using the identified first mmW communication beam set (e.g., via SS blocks). In some examples, base station 105-*b* may identify a first antenna port set to transmit the SS prior to the transmission.

At 415, UE 115-*b* may identify the first mmW communication beam set corresponding to reception of one or more of the SS blocks. In some cases, identifying the first mmW communication beam set to receive the SS includes determining whether a received signal strength of one or more of the first mmW communication beam set satisfies a threshold, or whether a signal strength of one or more beams of the first mmW communication beam set is greater than a signal strength of one or more candidate mmW communication beam sets, or a combination thereof. Additionally or alternatively, identifying the first mmW communication beam set may include selecting a subarray (e.g., from a subarray set) to receive one or more SS blocks, where the selection may be based on a signal strength of the beam set pairs (the first mmW communication beam set and selected receive beams).

At 420, base station 105-*b* may identify a second mmW communication beam set to transmit an RS, where the second mmW communication beam set may be associated with the first mmW communication beam set. For instance, the first mmW communication beam set and the second mmW communication beam set (and, correspondingly, the signals transmitted using those beam sets) may have a QCL relationship. The second mmW communication beam set may include multiple beams. In some examples, the second mmW communication beam set includes the first mmW communication beam set. That is, the second mmW communication beam set may be the same as the first mmW communication beam set. Alternatively, the second mmW communication beam set may be similar to the first mmW communication beam set. In some examples, base station 105-*b* may receive an indication of the second mmW communication beam set to transmit the RS, where identifying the second mmW communication beam set to transmit the RS is based on the received indication. Base station 105-*b* may subsequently transmit an indication of the second mmW communication beam set to UE 115-*b*.

In some cases, the first mmW communication beam set includes a first parameter that is within a predetermined range of a second parameter of the second mmW communication beam set. For instance, a beam or beams in the first mmW communication beam set may have the same transmit/receive angle as a beam or beams in the second mmW communication beam set. In such cases, base station 105-*b* may determine that a transmit angle of at least some of the first mmW communication beam set is similar to or identical to a transmit angle of at least some of the second mmW communication beam set. Beams in each set may also, for example, have a similar beam width.

At 423, base station 105-*b* may optionally transmit an indication of the second mmW communication beam set used for the transmission of the RS. In such cases, the indication may be sent for different RSs to be transmitted, where base station 105-*b* may provide an indication of the second mmW communication beam set prior to the transmission of the RS. For example, a DMRS associated with a UE-specific PDCCH (or PDSCH) may be associated with an SS block, and base station 105-*b* may provide an indication of the second mmW communication beam set used for the DMRS transmission. In this way, the indication may be dynamically transmitted to UE 115-*b* such that UE 115-*b* may use the same beam used for receiving the SS to receive the DMRS.

At 425, UE 115-*b* may identify the second mmW communication beam set to receive the RS based on the identified first mmW communication beam set to receive the SS, where the second mmW communication beam set may be associated with the first mmW communication beam set. In some cases, UE 115-*b* may identify the second mmW communication beam set based on predetermined relationships between the SS and another signal. For example, base station 105-*b* may transmit a DMRS for a PDCCH common to multiple UEs 115 (e.g., including UE 115-*b*), which may be sent on multiple beams in a beam sweeping pattern. Accordingly, UE 115-*b* may identify the second mmW communication beam set based on a predetermined relationship (e.g., an index) between the previously received SS and the DMRS for the common PDCCH. In other cases, UE 115-*b* may identify the second mmW communication beam set based on the indication received from base station 105-*b* at 423.

In some cases, identifying the second mmW communication beam set may include determining that one or more antenna ports corresponding to the RS are QCL with one or more antenna ports corresponding to the SS. Additionally or alternatively, identifying the second mmW communication beam set may include determining that the second mmW communication beam set comprises the first mmW communication beam set (e.g., where the second mmW communication beam set may be the same or similar to the first mmW communication beam set). In some cases, identifying the second mmW communication beam set may include determining that the first mmW communication beam set includes a first parameter that is within a predetermined range of a second parameter of the second mmW communication beam set.

At 430, base station 105-*b* may transmit, the RS using the identified second mmW communication beam set. The UE 115-*b* may receive one or more of the beams of the identified second mmW communication beam set. In some cases, base station 105-*b* may identify a second antenna port set to transmit the RS, the second antenna port set being QCL with the first antenna port set. In some examples, transmitting the RS using the identified second mmW communication beam set includes transmitting the RS using the second antenna port set.

At 435, UE 115-*b* may perform a beam refinement procedure based on the identified second mmW communication beam set. In some cases, UE 115-*b* may receive a subsequent SS or a subsequent RS based at least in part on the identified second mmW communication beam set and the beam refinement procedure.

Figure 5:
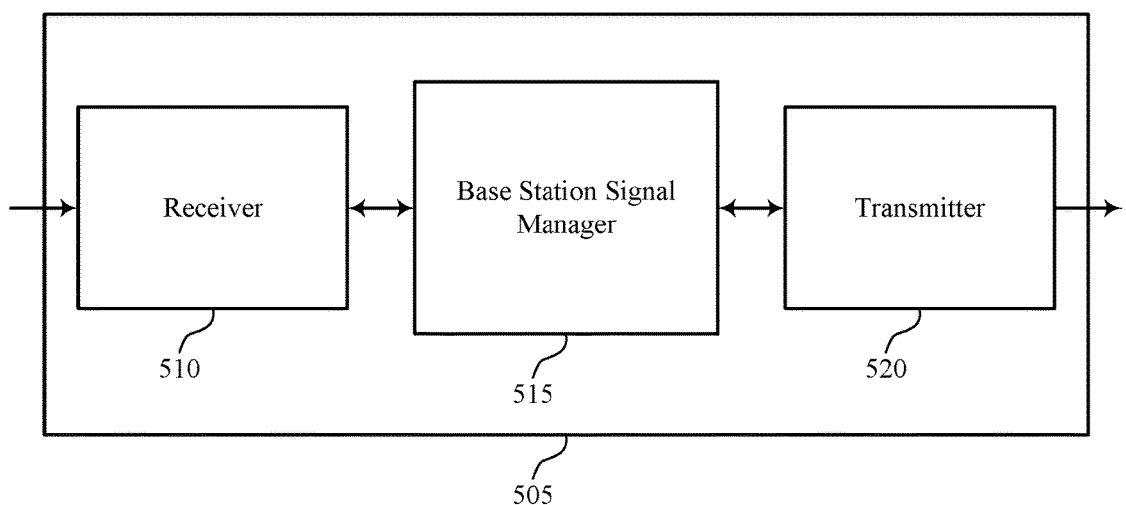
FIGS. 5 through 7 show block diagrams of a device that supports association between SS beams and RS beams in accordance with aspects of the present disclosure.

FIG. 5 shows a block diagram 500 of a wireless device 505 that supports association between SS beams and RS beams in accordance with aspects of the present disclosure. Wireless device 505 may be an example of aspects of a base station 105 as described with reference to FIG. 1. Wireless device 505 may include receiver 510, base station signal manager 515, and transmitter 520. Wireless device 505 may also include a processor. Each of these components may be in communication with one another (e.g., via one or more buses).

Receiver 510 may receive information such as packets, user data, or control information associated with various information channels (e.g., control channels, data channels, and information related to association between SS beams and RS beams). Information may be passed on to other components of the device. The receiver 510 may be an example of aspects of the transceiver 835 described with reference to FIG. 8.

Base station signal manager 515 may be an example of aspects of the base station signal manager 815 described with reference to FIG. 8. Base station signal manager 515 and/or at least some of its various sub-components may be implemented in hardware, software executed by a processor, firmware, or any combination thereof. If implemented in software executed by a processor, the functions of the base station signal manager 515 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure.

The base station signal manager 515 and/or at least some of its various sub-components may be physically located at various positions, including being distributed such that portions of functions are implemented at different physical locations by one or more physical devices. In some examples, base station signal manager 515 and/or at least some of its various sub-components may be a separate and distinct component in accordance with various aspects of the present disclosure. In other examples, base station signal manager 515 and/or at least some of its various sub-components may be combined with one or more other hardware components, including but not limited to an input/output (I/O) component, a transceiver, a network server, another computing device, one or more other components described in the present disclosure, or a combination thereof in accordance with various aspects of the present disclosure.

Base station signal manager 515 may identify a first mmW communication beam set to transmit an SS to a wireless device and transmit the SS using the identified first mmW communication beam set. Base station signal manager 415 may also identify a second mmW communication beam set to transmit an RS, the second mmW communication beam set being associated with the first mmW communication beam set, and transmit the RS using the identified second mmW communication beam set.

Transmitter 520 may transmit signals generated by other components of the device. In some examples, the transmitter 520 may be collocated with a receiver 510 in a transceiver module. For example, the transmitter 520 may be an example of aspects of the transceiver 835 described with reference to FIG. 8. The transmitter 520 may include a single antenna, or it may include a set of antennas.

Figure 6:
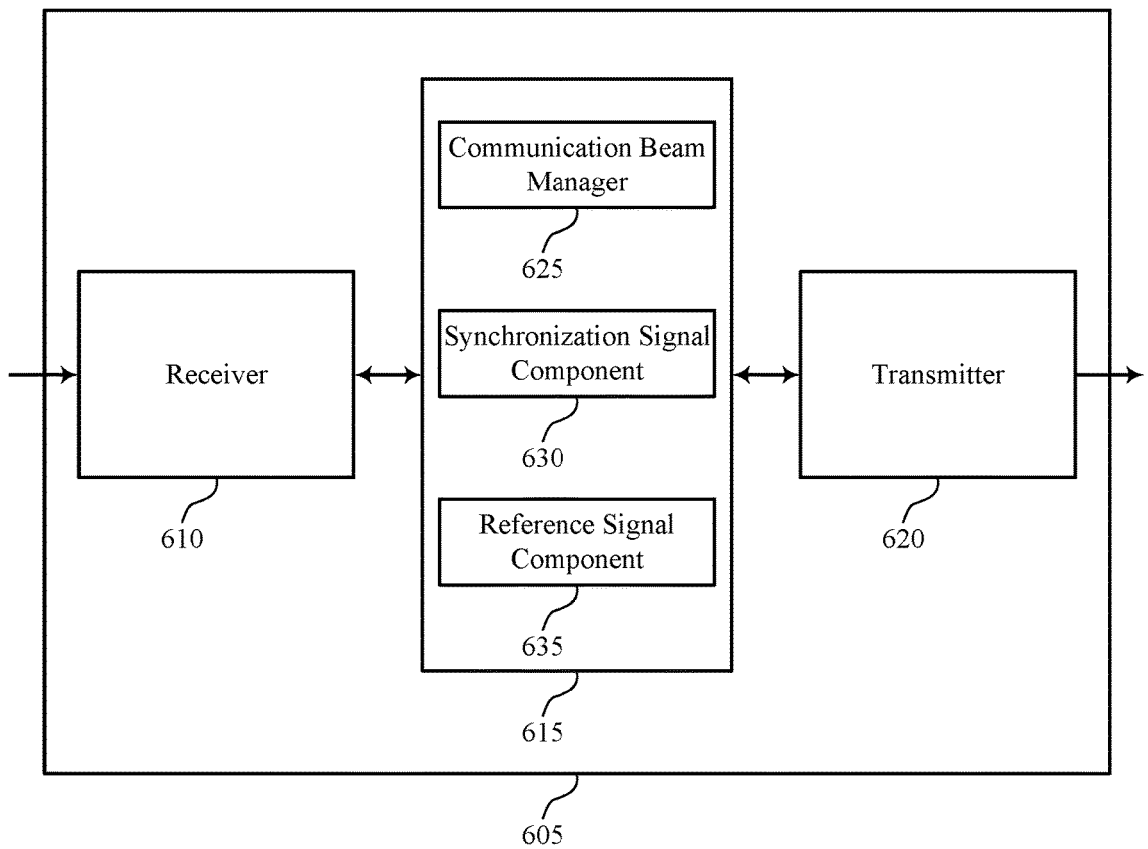

FIG. 6 shows a block diagram 600 of a wireless device 605 that supports association between SS beams and RS beams in accordance with aspects of the present disclosure. Wireless device 605 may be an example of aspects of a wireless device 505 or a base station 105 as described with reference to FIGS. 1 and 5. Wireless device 605 may include receiver 610, base station signal manager 615, and transmitter 620. Wireless device 605 may also include a processor. Each of these components may be in communication with one another (e.g., via one or more buses).

Receiver 610 may receive information such as packets, user data, or control information associated with various information channels (e.g., control channels, data channels, and information related to association between SS beams and RS beams). Information may be passed on to other components of the device. The receiver 610 may be an example of aspects of the transceiver 835 described with reference to FIG. 8.

Base station signal manager 615 may be an example of aspects of the base station signal manager 815 described with reference to FIG. 8. Base station signal manager 615 and/or at least some of its various sub-components may be implemented in hardware, software executed by a processor, firmware, or any combination thereof. If implemented in software executed by a processor, the functions of the base station signal manager 615 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure.

The base station signal manager 615 and/or at least some of its various sub-components may be physically located at various positions, including being distributed such that portions of functions are implemented at different physical locations by one or more physical devices. In some examples, base station signal manager 615 and/or at least some of its various sub-components may be a separate and distinct component in accordance with various aspects of the present disclosure. In other examples, base station signal manager 615 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure. Base station signal manager 615 may also include communication beam manager 625, synchronization signal component 630, and reference signal component 635.

Communication beam manager 625 may identify a first mmW communication beam set to transmit an SS to a wireless device and identify a second mmW communication beam set to transmit an RS, the second mmW communication beam set being associated with the first mmW communication beam set. In some cases, the second mmW communication beam set includes the first mmW communication beam set. Additionally or alternatively, the first mmW communication beam set includes a first parameter that is within a predetermined range of a second parameter of the second mmW communication beam set. In some cases, the first mmW communication beam set and the second mmW communication beam set each includes multiple mmW communication beams. Synchronization signal component 630 may transmit the SS using the identified first mmW communication beam set. Reference signal component 635 may transmit the RS using the identified second mmW communication beam set.

Transmitter 620 may transmit signals generated by other components of the device. In some examples, the transmitter 620 may be collocated with a receiver 610 in a transceiver module. For example, the transmitter 620 may be an example of aspects of the transceiver 835 described with reference to FIG. 8. The transmitter 620 may include a single antenna, or it may include a set of antennas.

Figure 7:
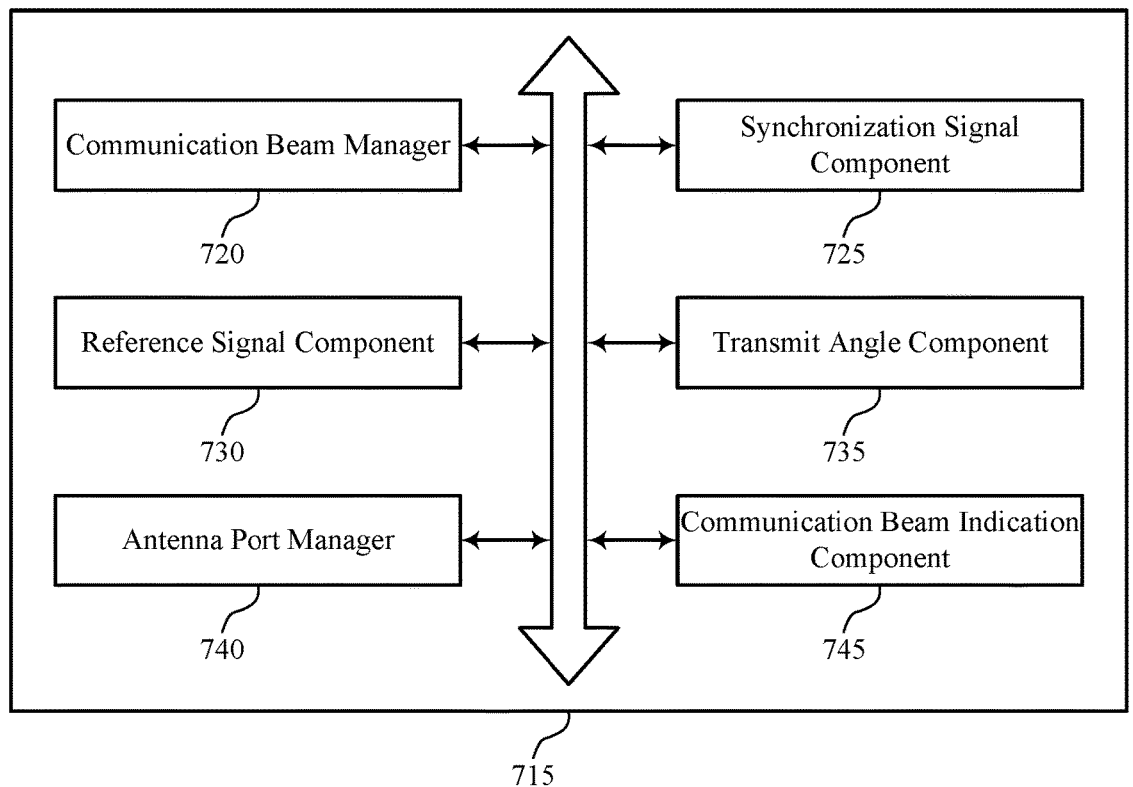

FIG. 7 shows a block diagram 700 of a base station signal manager 715 that supports association between SS beams and RS beams in accordance with aspects of the present disclosure. The base station signal manager 715 may be an example of aspects of a base station signal manager 515, a base station signal manager 615, or a base station signal manager 815 described with reference to FIGS. 5, 6, and 8. The base station signal manager 715 may include communication beam manager 720, synchronization signal component 725, reference signal component 730, transmit angle component 735, antenna port manager 740, and communication beam indication component 745. Each of these modules may communicate, directly or indirectly, with one another (e.g., via one or more buses).

Base station signal manager 715 and/or at least some of its various sub-components may be implemented in hardware, software executed by a processor, firmware, or any combination thereof. If implemented in software executed by a processor, the functions of the base station signal manager 715 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure.

The base station signal manager 715 and/or at least some of its various sub-components may be physically located at various positions, including being distributed such that portions of functions are implemented at different physical locations by one or more physical devices. In some examples, base station signal manager 715 and/or at least some of its various sub-components may be a separate and distinct component in accordance with various aspects of the present disclosure. In other examples, base station signal manager 715 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Communication beam manager 720 may identify a first mmW communication beam set to transmit an SS to a wireless device and identify a second mmW communication beam set to transmit an RS, the second mmW communication beam set being associated with the first mmW communication beam set. In some cases, the second mmW communication beam set includes the first mmW communication beam set. In some cases, the first mmW communication beam set includes a first parameter that is within a predetermined range of a second parameter of the second mmW communication beam set. In some cases, the first mmW communication beam set includes multiple mmW communication beams. In some cases, the second mmW communication beam set includes multiple mmW communication beams.

Synchronization signal component 725 may transmit the SS using the identified first mmW communication beam set. Reference signal component 730 may transmit the RS using the identified second mmW communication beam set. Transmit angle component 735 may determine that a transmit angle of at least some of the first mmW communication beam set is similar to or identical to a transmit angle of at least some of the second mmW communication beam set.

Antenna port manager 740 may identify a first antenna port set to transmit the SS. In some cases, identifying a second antenna port set to transmit the RS, the second antenna port set being QCL with the first antenna port set, where transmitting the RS using the identified second mmW communication beam set includes: transmitting the RS using the second antenna port set.

Communication beam indication component 745 may receive, from a network entity, an indication of the second mmW communication beam set to transmit the RS, where identifying the second mmW communication beam set to transmit the RS is based on the received indication. In some examples, communication beam indication component 645 may transmit an indication of the second mmW communication beam set to the wireless device.

Figure 8:
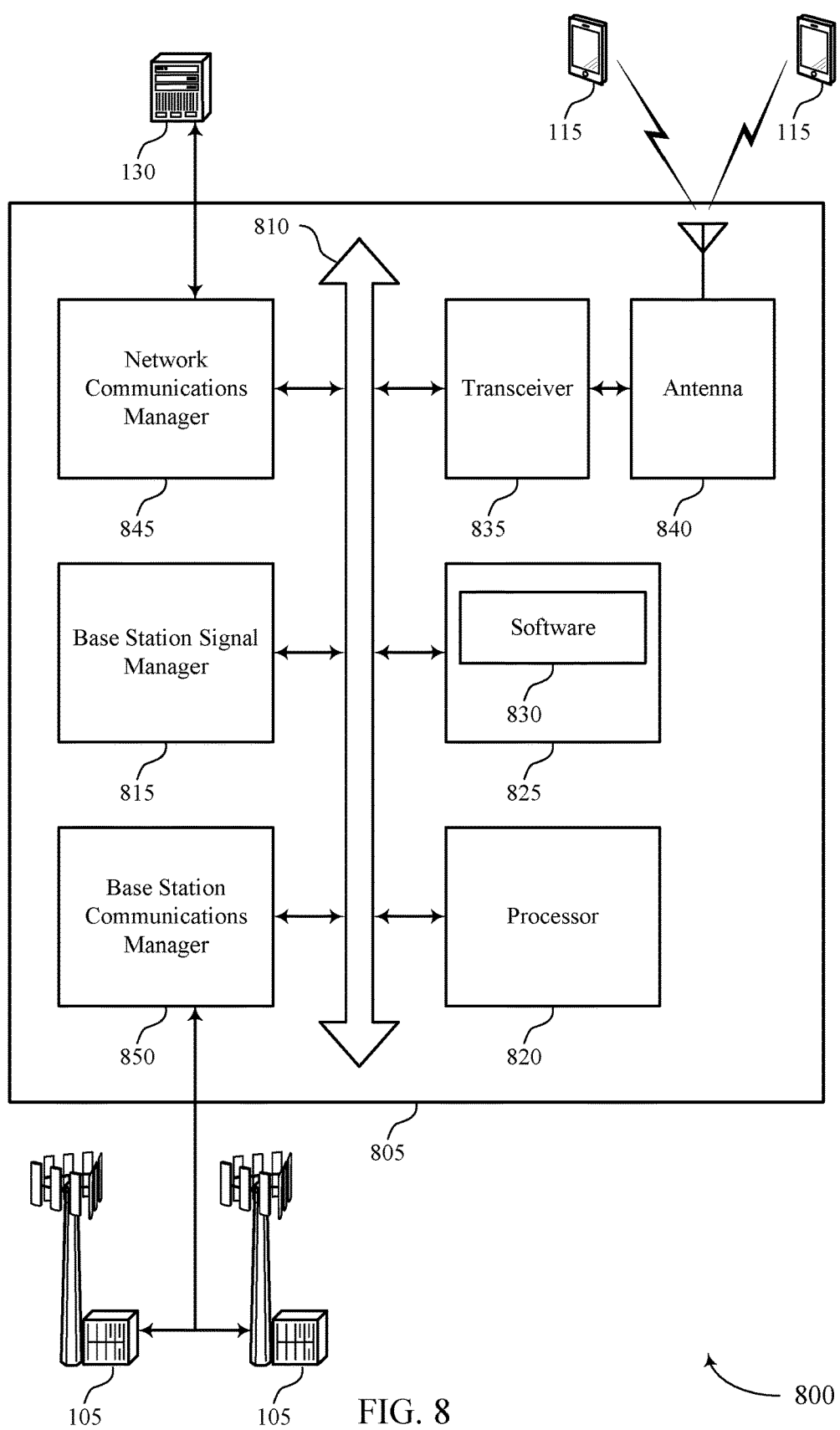
FIG. 8 illustrates a block diagram of a system including a base station that supports association between SS beams and RS beams in accordance with aspects of the present disclosure.

FIG. 8 shows a diagram of a system 800 including a device 805 that supports association between SS beams and RS beams in accordance with aspects of the present disclosure. Device 805 may be an example of or include the components of wireless device 505, wireless device 605, or a base station 105 as described above, e.g., with reference to FIGS. 1, 5 and 6. Device 805 may include components for bi-directional voice and data communications including components for transmitting and receiving communications, including base station signal manager 815, processor 820, memory 825, software 830, transceiver 835, antenna 840, network communications manager 845, and base station communications manager 850. These components may be in electronic communication via one or more busses (e.g., bus 810). Device 805 may communicate wirelessly with one or more UEs 115.

Processor 820 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 820 may be configured to operate a memory array using a memory controller. In other cases, a memory controller may be integrated into processor 820. Processor 820 may be configured to execute computer-readable instructions stored in a memory to perform various functions (e.g., functions or tasks supporting association between SS beams and RS beams).

Memory 825 may include random access memory (RAM) and read only memory (ROM). The memory 825 may store computer-readable, computer-executable software 830 including instructions that, when executed, cause the processor to perform various functions described herein. In some cases, the memory 825 may contain, among other things, a basic input/output system (BIOS) which may control basic hardware and/or software operation such as the interaction with peripheral components or devices.

Software 830 may include code to implement aspects of the present disclosure, including code to support association between SS beams and RS beams. Software 830 may be stored in a non-transitory computer-readable medium such as system memory or other memory. In some cases, the software 830 may not be directly executable by the processor but may cause a computer (e.g., when compiled and executed) to perform functions described herein.

Transceiver 835 may communicate bi-directionally, via one or more antennas, wired, or wireless links as described above. For example, the transceiver 835 may represent a wireless transceiver and may communicate bi-directionally with another wireless transceiver. The transceiver 835 may also include a modem to modulate the packets and provide the modulated packets to the antennas for transmission, and to demodulate packets received from the antennas.

In some cases, the wireless device may include a single antenna 840. However, in some cases the device may have more than one antenna 840, which may be capable of concurrently transmitting or receiving multiple wireless transmissions. Network communications manager 845 may manage communications with the core network (e.g., via one or more wired backhaul links). For example, the network communications manager 845 may manage the transfer of data communications for client devices, such as one or more UEs 115.

Base station communications manager 850 may manage communications with other base station 105, and may include a controller or scheduler for controlling communications with UEs 115 in cooperation with other base stations 105. For example, the base station communications manager 850 may coordinate scheduling for transmissions to UEs 115 for various interference mitigation techniques such as beamforming or joint transmission. In some examples, base station communications manager 850 may provide an X2 interface within an LTE/LTE-A wireless communication network technology to provide communication between base stations 105.

Figure 9:
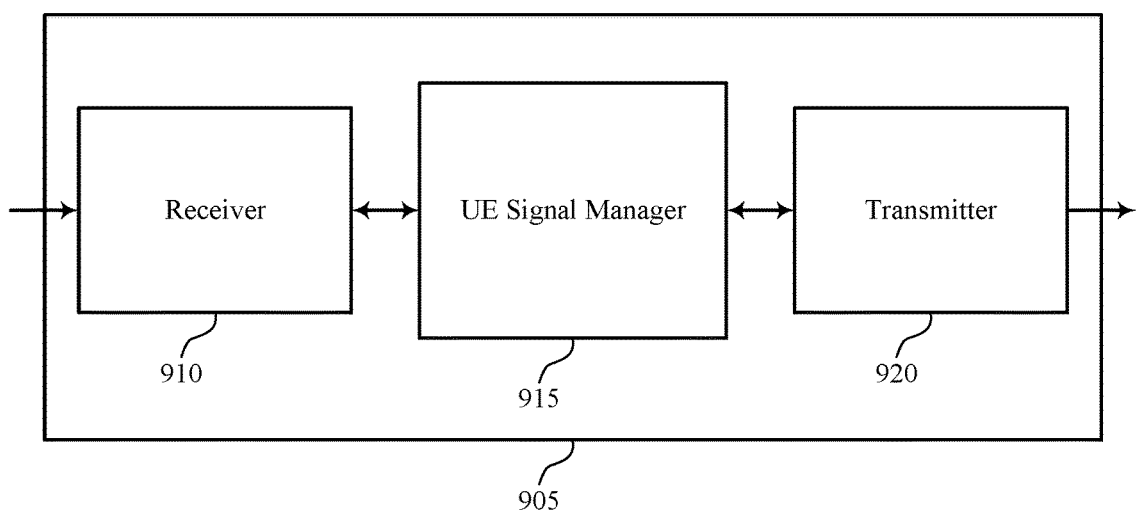
FIGS. 9 through 11 show block diagrams of a device that supports association between SS beams and RS beams in accordance with aspects of the present disclosure.

FIG. 9 shows a block diagram 900 of a wireless device 905 that supports association between SS beams and RS beams in accordance with aspects of the present disclosure. Wireless device 905 may be an example of aspects of a UE 115 as described with reference to FIG. 1. Wireless device 905 may include receiver 910, UE signal manager 915, and transmitter 920. Wireless device 905 may also include a processor. Each of these components may be in communication with one another (e.g., via one or more buses).

Receiver 910 may receive information such as packets, user data, or control information associated with various information channels (e.g., control channels, data channels, and information related to association between SS beams and RS beams). Information may be passed on to other components of the device. The receiver 910 may be an example of aspects of the transceiver 1235 described with reference to FIG. 12.

UE signal manager 915 may be an example of aspects of the UE signal manager 1215 described with reference to FIG. 12. UE signal manager 915 and/or at least some of its various sub-components may be implemented in hardware, software executed by a processor, firmware, or any combination thereof. If implemented in software executed by a processor, the functions of the UE signal manager 915 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure.

The UE signal manager 915 and/or at least some of its various sub-components may be physically located at various positions, including being distributed such that portions of functions are implemented at different physical locations by one or more physical devices. In some examples, UE signal manager 915 and/or at least some of its various sub-components may be a separate and distinct component in accordance with various aspects of the present disclosure. In other examples, UE signal manager 915 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE signal manager 915 may identify a first mmW communication beam set to receive an SS, identify a second mmW communication beam set to receive an RS based on the identified first mmW communication beam set to receive the SS, the second mmW communication beam set being associated with the first mmW communication beam set, and receive the RS using the identified second mmW communication beam set.

Transmitter 920 may transmit signals generated by other components of the device. In some examples, the transmitter 920 may be collocated with a receiver 910 in a transceiver module. For example, the transmitter 920 may be an example of aspects of the transceiver 1235 described with reference to FIG. 12. The transmitter 920 may include a single antenna, or it may include a set of antennas.

Figure 10:
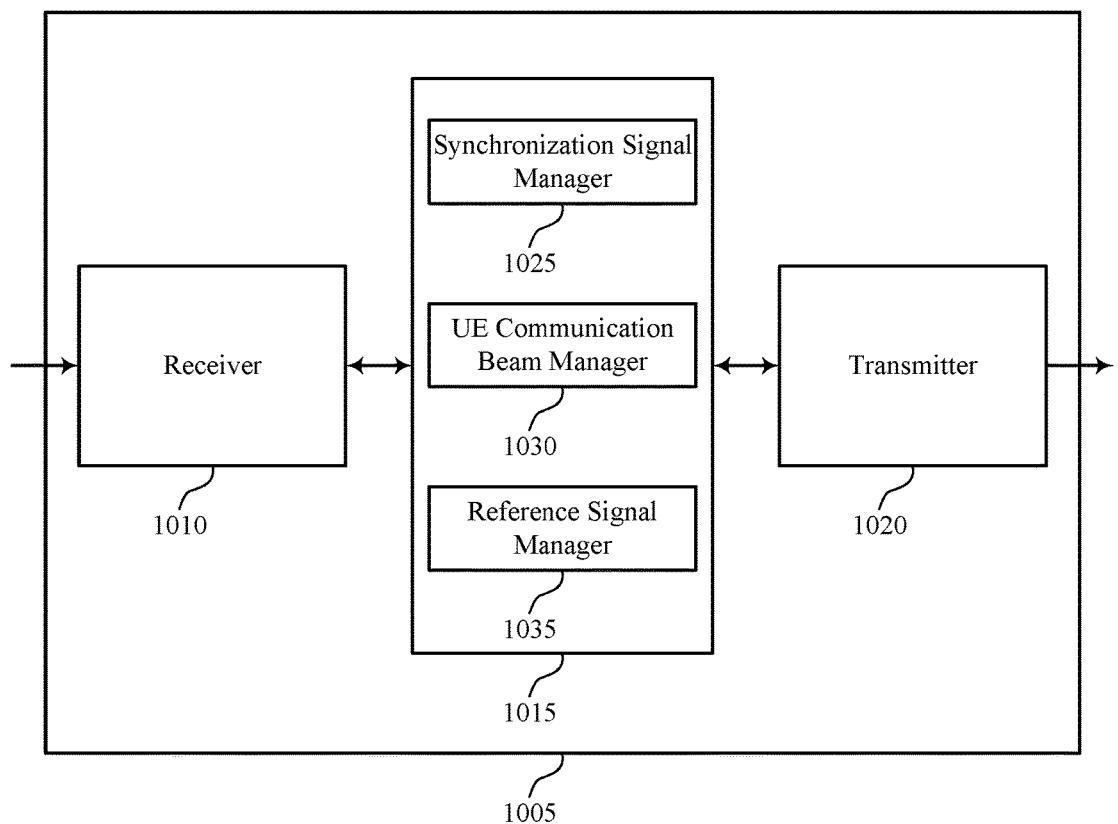

FIG. 10 shows a block diagram 1000 of a wireless device 1005 that supports association between SS beams and RS beams in accordance with aspects of the present disclosure. Wireless device 1005 may be an example of aspects of a wireless device 905 or a UE 115 as described with reference to FIGS. 1 and 9. Wireless device 1005 may include receiver 1010, UE signal manager 1015, and transmitter 1020. Wireless device 1005 may also include a processor. Each of these components may be in communication with one another (e.g., via one or more buses).

Receiver 1010 may receive information such as packets, user data, or control information associated with various information channels (e.g., control channels, data channels, and information related to association between SS beams and RS beams). Information may be passed on to other components of the device. The receiver 1010 may be an example of aspects of the transceiver 1235 described with reference to FIG. 12.

UE signal manager 1015 may be an example of aspects of the UE signal manager 1215 described with reference to FIG. 12. UE signal manager 1015 and/or at least some of its various sub-components may be implemented in hardware, software executed by a processor, firmware, or any combination thereof. If implemented in software executed by a processor, the functions of the UE signal manager 1015 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure.

The UE signal manager 1015 and/or at least some of its various sub-components may be physically located at various positions, including being distributed such that portions of functions are implemented at different physical locations by one or more physical devices. In some examples, UE signal manager 1015 and/or at least some of its various sub-components may be a separate and distinct component in accordance with various aspects of the present disclosure. In other examples, UE signal manager 1015 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure. UE signal manager 1015 may also include synchronization signal manager 1025, UE communication beam manager 1030, and reference signal manager 1035.

Synchronization signal manager 1025 may identify a first mmW communication beam set to receive an SS and receive the SS using the first mmW communication beam set. UE communication beam manager 1030 may identify a second mmW communication beam set to receive an RS based on the identified first mmW communication beam set to receive the SS, the second mmW communication beam set being associated with the first mmW communication beam set. In some cases, identifying the first mmW communication beam set to receive the SS includes determining whether a received signal strength of the first mmW communication beam set satisfies a threshold, or whether a signal strength of the first mmW communication beam set is greater than a signal strength of one or more candidate mmW communication beam sets, or a combination thereof. In some cases, identifying the second mmW communication beam set includes: determining that one or more antenna ports corresponding to the RS are quasi co-located with one or more antenna ports corresponding to the SS. In some cases, identifying the second mmW communication beam set includes: determining that the second mmW communication beam set includes the first mmW communication beam set. In some cases, identifying the second mmW communication beam set includes determining that the first mmW communication beam set includes a first parameter that is within a predetermined range of a second parameter of the second mmW communication beam set.

Reference signal manager 1035 may receive the RS using the identified second mmW communication beam set. Transmitter 1020 may transmit signals generated by other components of the device. In some examples, the transmitter 1020 may be collocated with a receiver 1010 in a transceiver module. For example, the transmitter 1020 may be an example of aspects of the transceiver 1235 described with reference to FIG. 12. The transmitter 1020 may include a single antenna, or it may include a set of antennas.

Figure 11:
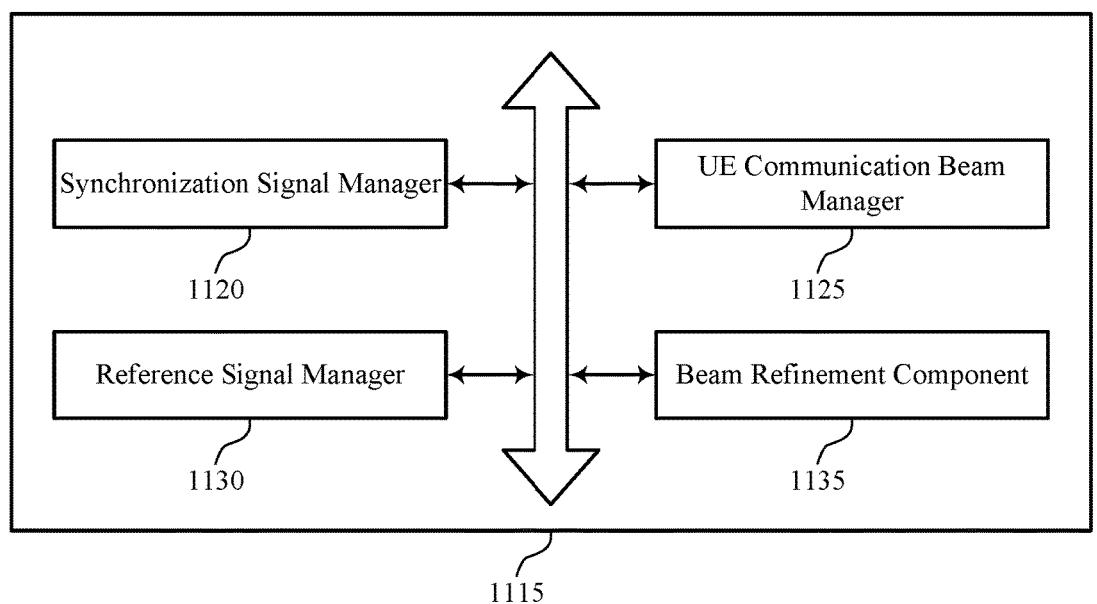

FIG. 11 shows a block diagram 1100 of a UE signal manager 1115 that supports association between SS beams and RS beams in accordance with aspects of the present disclosure. The UE signal manager 1115 may be an example of aspects of a UE signal manager 1215 described with reference to FIGS. 9, 10, and 12. The UE signal manager 1115 may include synchronization signal manager 1120, UE communication beam manager 1125, reference signal manager 1130, and beam refinement component 1135. Each of these modules may communicate, directly or indirectly, with one another (e.g., via one or more buses).

UE signal manager 1115 and/or at least some of its various sub-components may be implemented in hardware, software executed by a processor, firmware, or any combination thereof. If implemented in software executed by a processor, the functions of the UE signal manager 1115 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure.

The UE signal manager 1115 and/or at least some of its various sub-components may be physically located at various positions, including being distributed such that portions of functions are implemented at different physical locations by one or more physical devices. In some examples, UE signal manager 1115 and/or at least some of its various sub-components may be a separate and distinct component in accordance with various aspects of the present disclosure. In other examples, UE signal manager 1115 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Synchronization signal manager 1120 may identify a first mmW communication beam set to receive an SS and receive the SS using the first mmW communication beam set. UE communication beam manager 1125 may identify a second mmW communication beam set to receive an RS based on the identified first mmW communication beam set to receive the SS, the second mmW communication beam set being associated with the first mmW communication beam set. In some cases, identifying the first mmW communication beam set to receive the SS includes determining whether a received signal strength of the first mmW communication beam set satisfies a threshold, or whether a signal strength of the first mmW communication beam set is greater than a signal strength of one or more candidate mmW communication beam sets, or a combination thereof.

In some examples, identifying the first mmW communication beam set to receive the SS includes selecting a subarray to receive the SS from a subarray set, the selecting being based at least in part on a signal strength of the SS. In some cases, identifying the first mmW communication beam set to receive the SS includes selecting a subarray to receive the SS from a subarray set, the selecting being based on a signal strength of the SS. In some cases, identifying the second mmW communication beam set includes determining that one or more antenna ports corresponding to the RS are quasi co-located with one or more antenna ports corresponding to the SS. In some cases, identifying the second mmW communication beam set includes determining that the second mmW communication beam set includes the first mmW communication beam set. In some cases, identifying the second mmW communication beam set includes determining that the first mmW communication beam set includes a first parameter that is within a predetermined range of a second parameter of the second mmW communication beam set.

Reference signal manager 1130 may receive the RS using the identified second mmW communication beam set. Beam refinement component 1135 may perform a beam refinement procedure based on the identified second mmW communication beam set and receive a subsequent SS or a subsequent RS based on the identified second mmW communication beam set and the beam refinement procedure.

Figure 12:
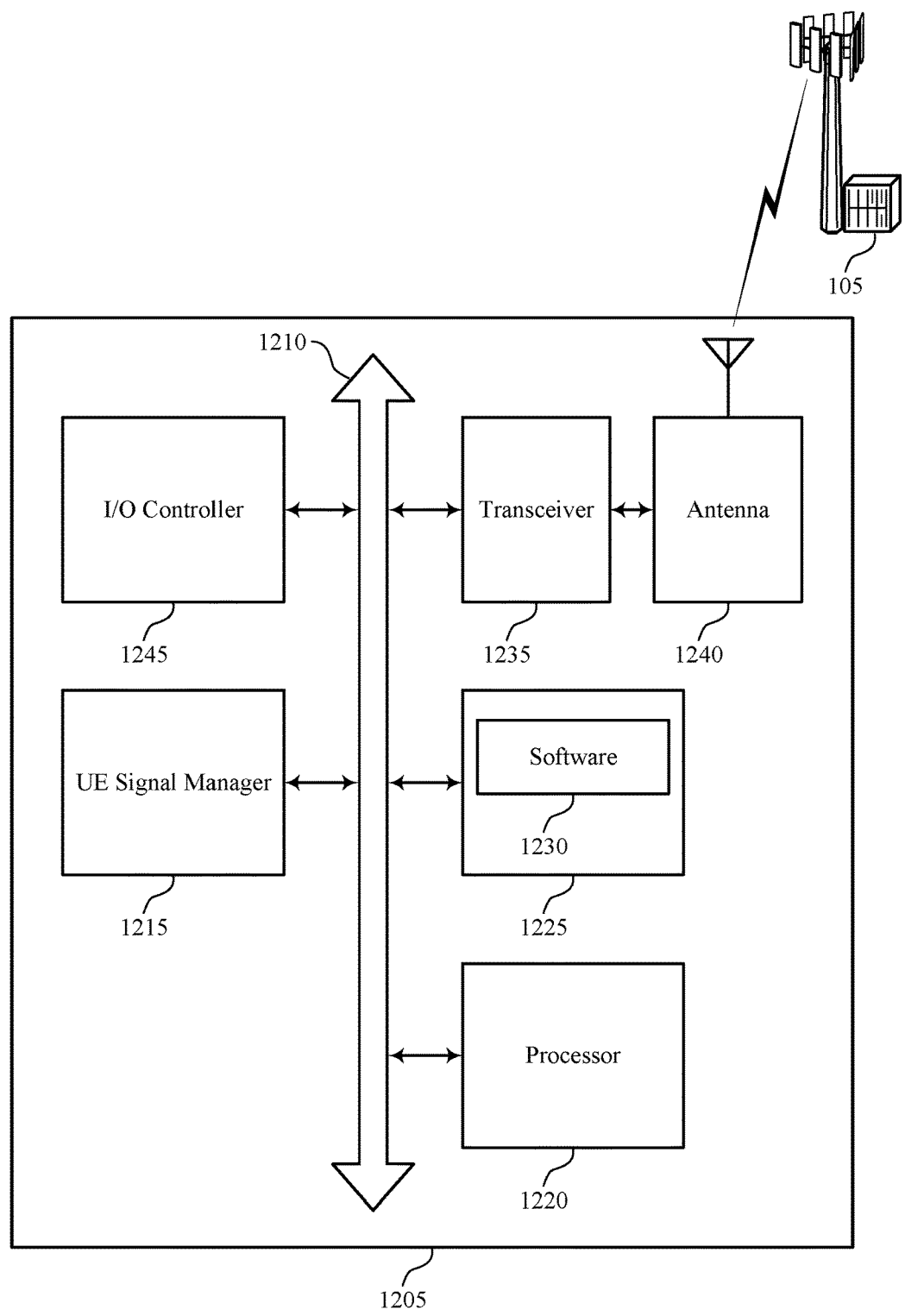
FIG. 12 illustrates a block diagram of a system including a user equipment (UE) that supports association between SS beams and RS beams in accordance with aspects of the present disclosure.

FIG. 12 shows a diagram of a system 1200 including a device 1205 that supports association between SS beams and RS beams in accordance with aspects of the present disclosure. Device 1205 may be an example of or include the components of UE 115 as described above, e.g., with reference to FIG. 1. Device 1205 may include components for bi-directional voice and data communications including components for transmitting and receiving communications, including UE signal manager 1215, processor 1220, memory 1225, software 1230, transceiver 1235, antenna 1240, and I/O controller 1245. These components may be in electronic communication via one or more busses (e.g., bus 1210). Device 1205 may communicate wirelessly with one or more base stations 105.

Processor 1220 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1220 may be configured to operate a memory array using a memory controller. In other cases, a memory controller may be integrated into processor 1220. Processor 1220 may be configured to execute computer-readable instructions stored in a memory to perform various functions (e.g., functions or tasks supporting association between SS beams and RS beams).

Memory 1225 may include RAM and ROM. The memory 1225 may store computer-readable, computer-executable software 1230 including instructions that, when executed, cause the processor to perform various functions described herein. In some cases, the memory 1225 may contain, among other things, a BIOS which may control basic hardware and/or software operation such as the interaction with peripheral components or devices.

Software 1230 may include code to implement aspects of the present disclosure, including code to support association between SS beams and RS beams. Software 1230 may be stored in a non-transitory computer-readable medium such as system memory or other memory. In some cases, the software 1230 may not be directly executable by the processor but may cause a computer (e.g., when compiled and executed) to perform functions described herein.

Transceiver 1235 may communicate bi-directionally, via one or more antennas, wired, or wireless links as described above. For example, the transceiver 1235 may represent a wireless transceiver and may communicate bi-directionally with another wireless transceiver. The transceiver 1235 may also include a modem to modulate the packets and provide the modulated packets to the antennas for transmission, and to demodulate packets received from the antennas. In some cases, the wireless device may include a single antenna 1240. However, in some cases the device may have more than one antenna 1240, which may be capable of concurrently transmitting or receiving multiple wireless transmissions.

I/O controller 1245 may manage input and output signals for device 1205. I/O controller 1245 may also manage peripherals not integrated into device 1205. In some cases, I/O controller 1245 may represent a physical connection or port to an external peripheral. In some cases, I/O controller 1245 may utilize an operating system such as iOS®, ANDROID®, MS-DOS®, MS-WINDOWS®, OS/2®, UNIX®, LINUX®, or another known operating system. In other cases, I/O controller 1245 may represent or interact with a modem, a keyboard, a mouse, a touchscreen, or a similar device. In some cases, I/O controller 1245 may be implemented as part of a processor. In some cases, a user may interact with device 1205 via I/O controller 1245 or via hardware components controlled by I/O controller 1245.

Figure 13:
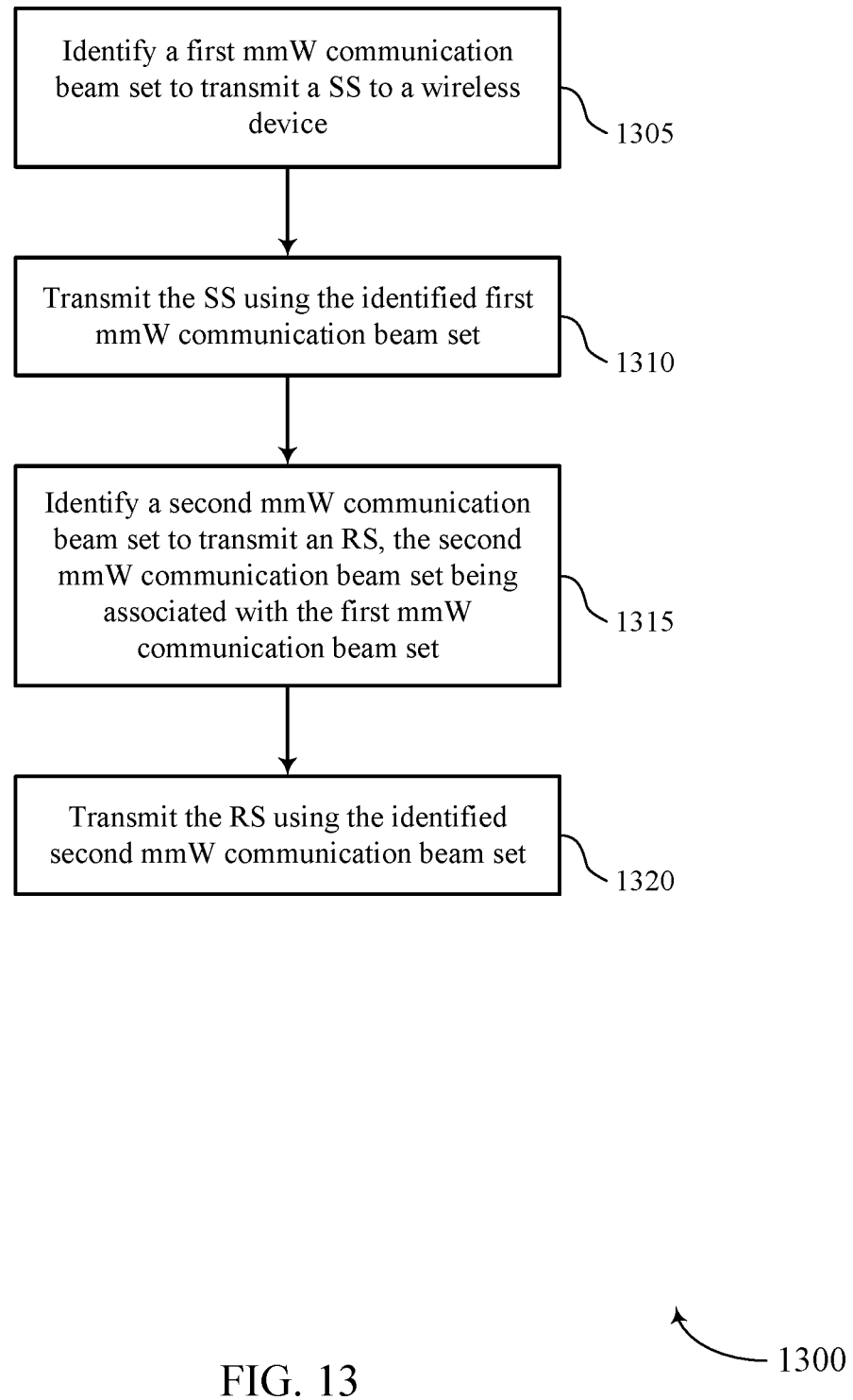
FIGS. 13 through 18 illustrate methods for association between SS beams and RS beams in accordance with aspects of the present disclosure.

FIG. 13 shows a flowchart illustrating a method 1300 for association between SS beams and RS beams in accordance with aspects of the present disclosure. The operations of method 1300 may be implemented by a base station 105 or its components as described herein. For example, the operations of method 1300 may be performed by a base station signal manager as described with reference to FIGS. 5 through 8. In some examples, a base station 105 may execute a set of codes to control the functional elements of the device to perform the functions described below. Additionally or alternatively, the base station 105 may perform aspects of the functions described below using special-purpose hardware.

At block 1305 the base station 105 may identify a first mmW communication beam set to transmit an SS to a wireless device. The operations of block 1305 may be performed according to the methods described with reference to FIGS. 1 through 4. In certain examples, aspects of the operations of block 1305 may be performed by a communication beam manager as described with reference to FIGS. 5 through 8.

At block 1310 the base station 105 may transmit the SS using the identified first mmW communication beam set. The operations of block 1310 may be performed according to the methods described with reference to FIGS. 1 through 4. In certain examples, aspects of the operations of block 1310 may be performed by a synchronization signal component as described with reference to FIGS. 5 through 8.

At block 1315 the base station 105 may identify a second mmW communication beam set to transmit an RS, the second mmW communication beam set being associated with the first mmW communication beam set. The operations of block 1315 may be performed according to the methods described with reference to FIGS. 1 through 4. In certain examples, aspects of the operations of block 1315 may be performed by a communication beam manager as described with reference to FIGS. 5 through 8.

At block 1320 the base station 105 may transmit the RS using the identified second mmW communication beam set. The operations of block 1320 may be performed according to the methods described with reference to FIGS. 1 through 4. In certain examples, aspects of the operations of block 1320 may be performed by a reference signal component as described with reference to FIGS. 5 through 8.

Figure 14:
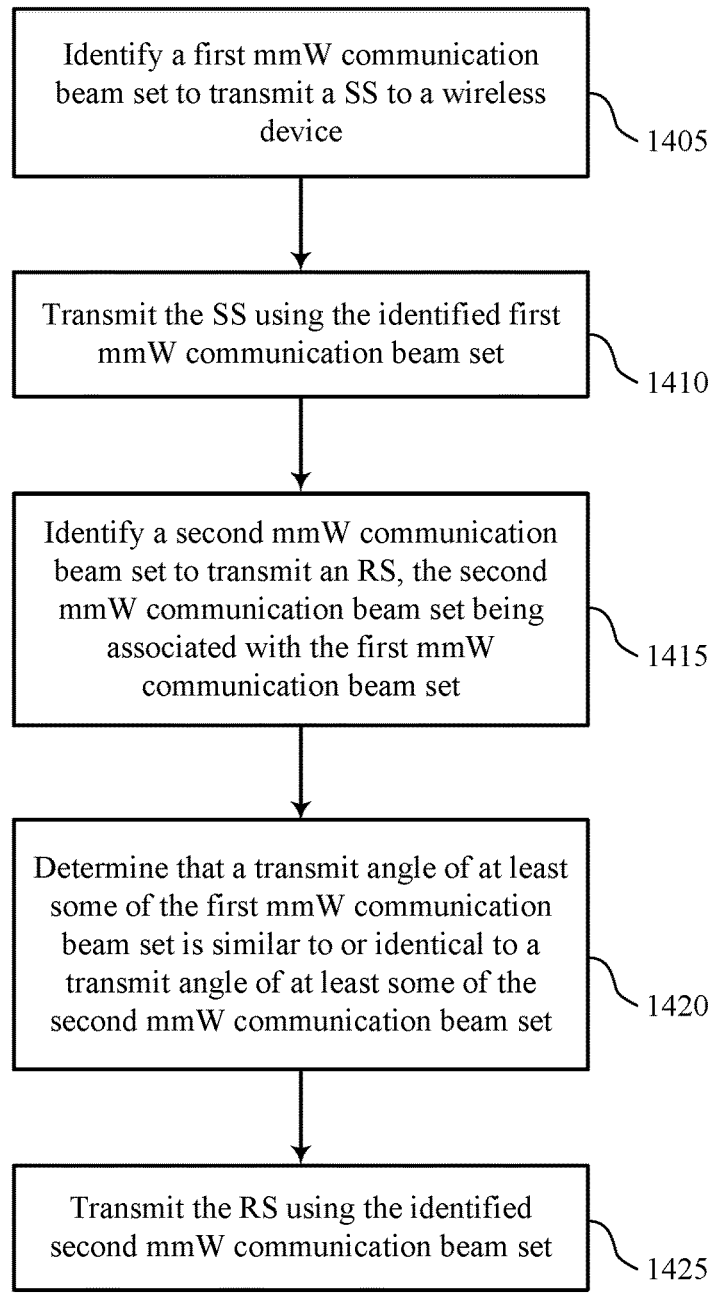

FIG. 14 shows a flowchart illustrating a method 1400 for association between SS beams and RS beams in accordance with aspects of the present disclosure. The operations of method 1400 may be implemented by a base station 105 or its components as described herein. For example, the operations of method 1400 may be performed by a base station signal manager as described with reference to FIGS. 5 through 8. In some examples, a base station 105 may execute a set of codes to control the functional elements of the device to perform the functions described below. Additionally or alternatively, the base station 105 may perform aspects of the functions described below using special-purpose hardware.

At block 1405 the base station 105 may identify a first mmW communication beam set to transmit an SS to a wireless device. The operations of block 1405 may be performed according to the methods described with reference to FIGS. 1 through 4. In certain examples, aspects of the operations of block 1405 may be performed by a communication beam manager as described with reference to FIGS. 5 through 8.

At block 1410 the base station 105 may transmit the SS using the identified first mmW communication beam set. The operations of block 1410 may be performed according to the methods described with reference to FIGS. 1 through 4. In certain examples, aspects of the operations of block 1410 may be performed by a synchronization signal component as described with reference to FIGS. 5 through 8.

At block 1415 the base station 105 may identify a second mmW communication beam set to transmit an RS, the second mmW communication beam set being associated with the first mmW communication beam set. The operations of block 1415 may be performed according to the methods described with reference to FIGS. 1 through 4. In certain examples, aspects of the operations of block 1415 may be performed by a communication beam manager as described with reference to FIGS. 5 through 8.

At block 1420 the base station 105 may determine that a transmit angle of at least some of the first mmW communication beam set is similar to or identical to a transmit angle of at least some of the second mmW communication beam set. The operations of block 1420 may be performed according to the methods described with reference to FIGS. 1 through 4. In certain examples, aspects of the operations of block 1420 may be performed by a transmit angle component as described with reference to FIGS. 5 through 8.

At block 1425 the base station 105 may transmit the RS using the identified second mmW communication beam set. The operations of block 1425 may be performed according to the methods described with reference to FIGS. 1 through 4. In certain examples, aspects of the operations of block 1425 may be performed by a reference signal component as described with reference to FIGS. 5 through 8.

Figure 15:
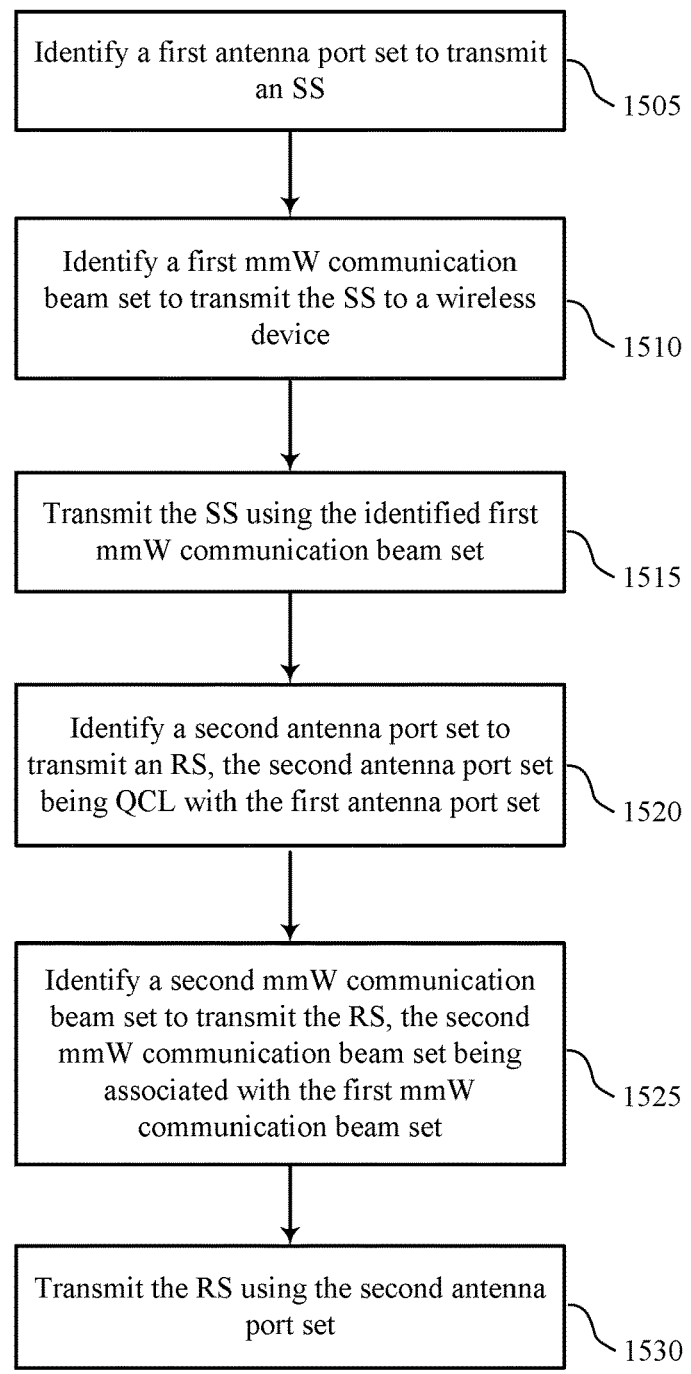

FIG. 15 shows a flowchart illustrating a method 1500 for association between SS beams and RS beams in accordance with aspects of the present disclosure. The operations of method 1500 may be implemented by a base station 105 or its components as described herein. For example, the operations of method 1500 may be performed by a base station signal manager as described with reference to FIGS. 5 through 8. In some examples, a base station 105 may execute a set of codes to control the functional elements of the device to perform the functions described below. Additionally or alternatively, the base station 105 may perform aspects of the functions described below using special-purpose hardware.

At block 1505 the base station 105 may identify a first antenna port set to transmit an SS. The operations of block 1505 may be performed according to the methods described with reference to FIGS. 1 through 4. In certain examples, aspects of the operations of block 1505 may be performed by an antenna port manager as described with reference to FIGS. 5 through 8.

At block 1510 the base station 105 may identify a first mmW communication beam set to transmit the SS to a wireless device. The operations of block 1510 may be performed according to the methods described with reference to FIGS. 1 through 4. In certain examples, aspects of the operations of block 1510 may be performed by a communication beam manager as described with reference to FIGS. 5 through 8.

At block 1515 the base station 105 may transmit the SS using the identified first mmW communication beam set and the first antenna port set. The operations of block 1515 may be performed according to the methods described with reference to FIGS. 1 through 4. In certain examples, aspects of the operations of block 1515 may be performed by a synchronization signal component as described with reference to FIGS. 5 through 8.

At block 1520 the base station may identify a second antenna port set to transmit an RS, the second antenna port set being QCL with the first antenna port set. The operations of block 1520 may be performed according to the methods described with reference to FIGS. 1 through 4. In certain examples, aspects of the operations of block 1520 may be performed by an antenna port manager as described with reference to FIGS. 5 through 8.

At block 1525 the base station 105 may identify a second mmW communication beam set to transmit the RS, the second mmW communication beam set being associated with the first mmW communication beam set. The operations of block 1525 may be performed according to the methods described with reference to FIGS. 1 through 4. In certain examples, aspects of the operations of block 1525 may be performed by a communication beam manager as described with reference to FIGS. 5 through 8.

At block 1530 the base station 105 may transmit the RS using the second antenna port set and the second mmW communication beam set. The operations of block 1530 may be performed according to the methods described with reference to FIGS. 1 through 4. In certain examples, aspects of the operations of block 1530 may be performed by a reference signal component as described with reference to FIGS. 5 through 8.

Figure 16:
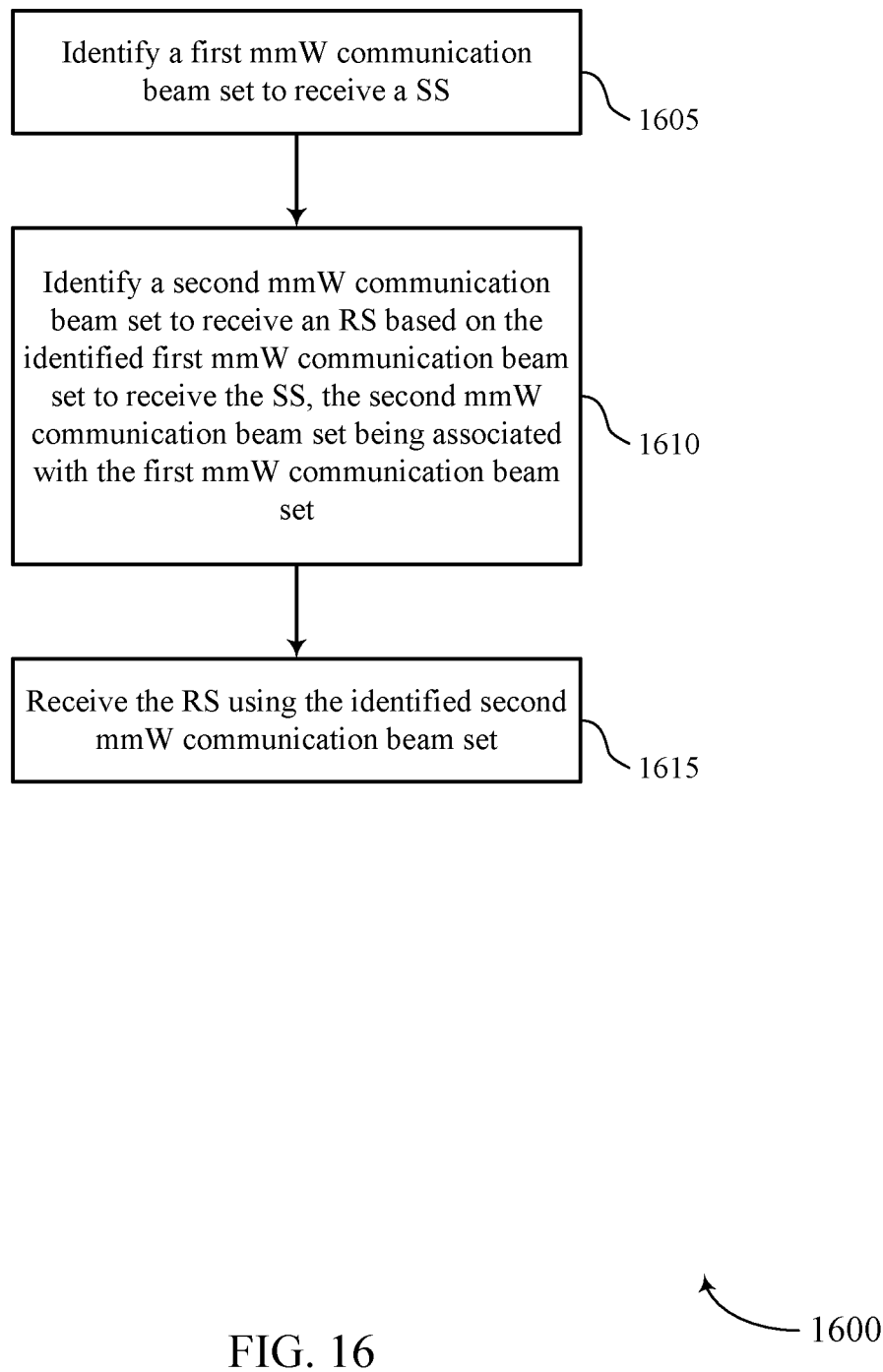

FIG. 16 shows a flowchart illustrating a method 1600 for association between SS beams and RS beams in accordance with aspects of the present disclosure. The operations of method 1600 may be implemented by a UE 115 or its components as described herein. For example, the operations of method 1600 may be performed by a UE signal manager as described with reference to FIGS. 9 through 12. In some examples, a UE 115 may execute a set of codes to control the functional elements of the device to perform the functions described below. Additionally or alternatively, the UE 115 may perform aspects of the functions described below using special-purpose hardware.

At block 1605 the UE 115 may identify a first mmW communication beam set to receive an SS. The operations of block 1605 may be performed according to the methods described with reference to FIGS. 1 through 4. In certain examples, aspects of the operations of block 1605 may be performed by a synchronization signal manager as described with reference to FIGS. 9 through 12.

At block 1610 the UE 115 may identify a second mmW communication beam set to receive an RS based at least in part on the identified first mmW communication beam set to receive the SS, the second mmW communication beam set being associated with the first mmW communication beam set. The operations of block 1610 may be performed according to the methods described with reference to FIGS. 1 through 4. In certain examples, aspects of the operations of block 1610 may be performed by a UE communication beam manager as described with reference to FIGS. 9 through 12.

At block 1615 the UE 115 may receive the RS using the identified second mmW communication beam set. The operations of block 1615 may be performed according to the methods described with reference to FIGS. 1 through 4. In certain examples, aspects of the operations of block 1615 may be performed by a reference signal manager as described with reference to FIGS. 9 through 12.

Figure 17:
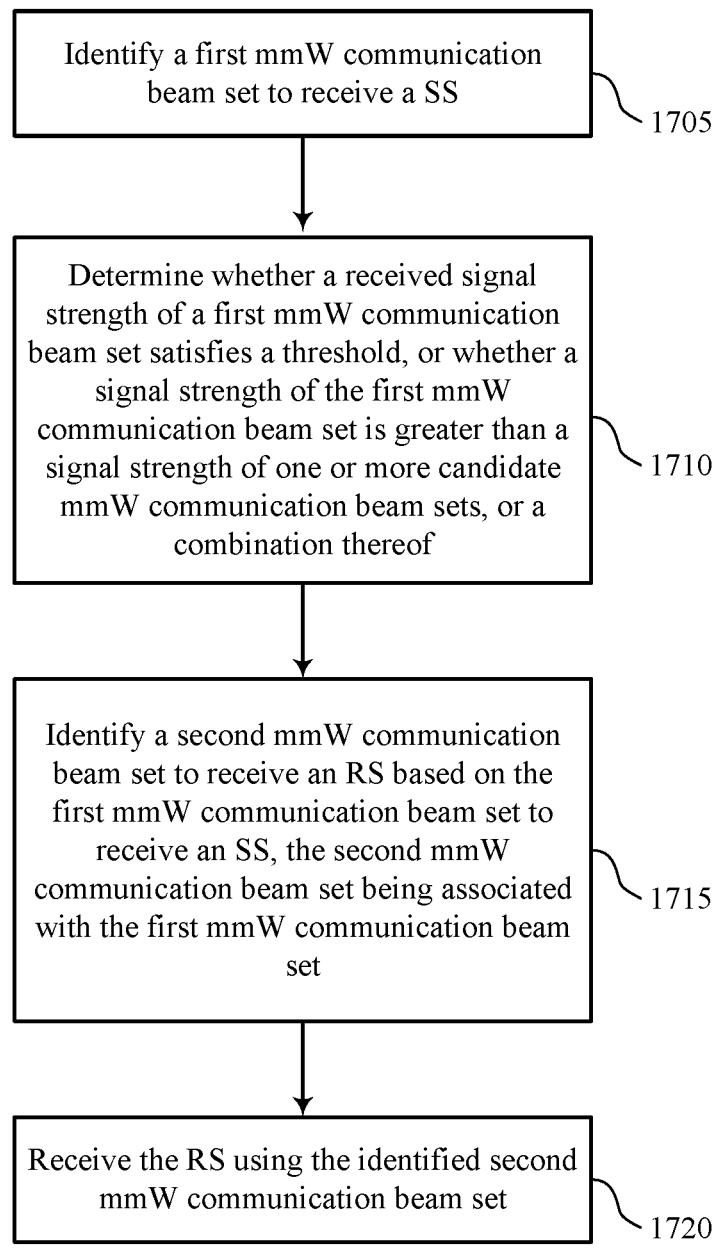

FIG. 17 shows a flowchart illustrating a method 1700 for association between SS beams and RS beams in accordance with aspects of the present disclosure. The operations of method 1700 may be implemented by a UE 115 or its components as described herein. For example, the operations of method 1700 may be performed by a UE signal manager as described with reference to FIGS. 9 through 12. In some examples, a UE 115 may execute a set of codes to control the functional elements of the device to perform the functions described below. Additionally or alternatively, the UE 115 may perform aspects of the functions described below using special-purpose hardware.

At block 1705 the UE 115 may identify a first mmW communication beam set to receive an SS. The operations of block 1705 may be performed according to the methods described with reference to FIGS. 1 through 4. In certain examples, aspects of the operations of block 1705 may be performed by a synchronization signal manager as described with reference to FIGS. 9 through 12.

At block 1710 the UE 115 may determine whether a received signal strength of the first mmW communication beam set satisfies a threshold, or whether a signal strength of the first mmW communication beam set is greater than a signal strength of one or more candidate mmW communication beam sets, or a combination thereof. The operations of block 1710 may be performed according to the methods described with reference to FIGS. 1 through 4. In certain examples, aspects of the operations of block 1710 may be performed by a synchronization signal manager as described with reference to FIGS. 9 through 12.

At block 1715 the UE 115 may identify a second mmW communication beam set to receive an RS based at least in part on the identified first mmW communication beam set to receive the SS, the second mmW communication beam set being associated with the first mmW communication beam set. The operations of block 1715 may be performed according to the methods described with reference to FIGS. 1 through 4. In certain examples, aspects of the operations of block 1715 may be performed by a UE communication beam manager as described with reference to FIGS. 9 through 12.

At block 1720 the UE 115 may receive the RS using the identified second mmW communication beam set. The operations of block 1720 may be performed according to the methods described with reference to FIGS. 1 through 4. In certain examples, aspects of the operations of block 1720 may be performed by a reference signal manager as described with reference to FIGS. 9 through 12.

Figure 18:
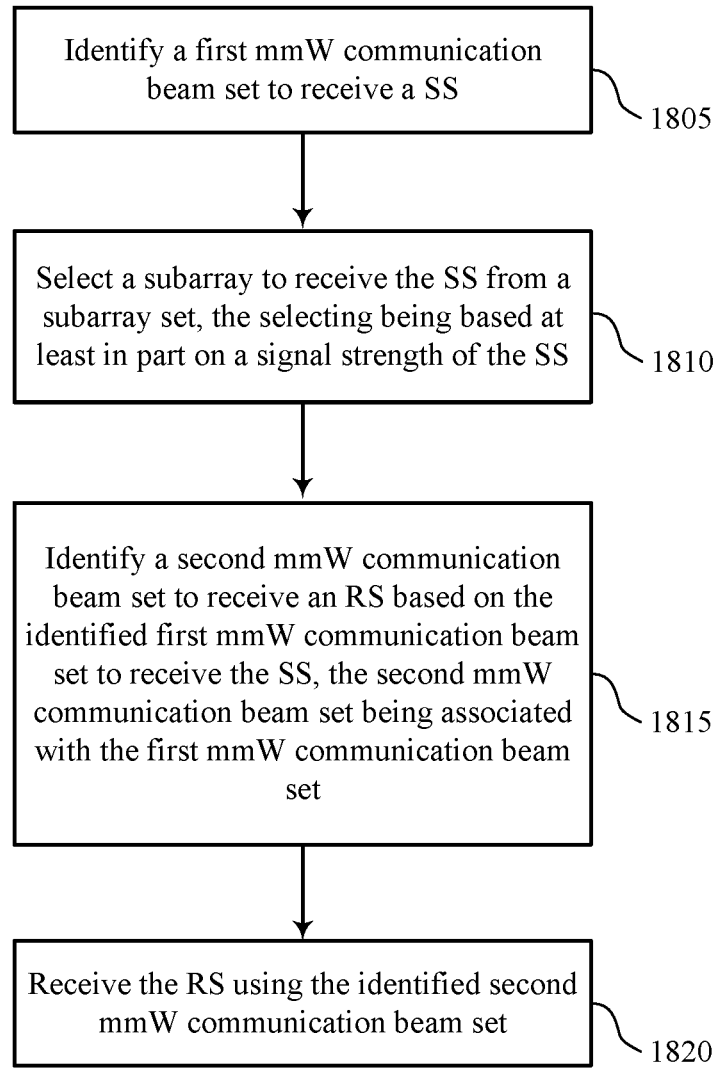

FIG. 18 shows a flowchart illustrating a method 1800 for association between SS beams and RS beams in accordance with aspects of the present disclosure. The operations of method 1800 may be implemented by a UE 115 or its components as described herein. For example, the operations of method 1800 may be performed by a UE signal manager as described with reference to FIGS. 9 through 12. In some examples, a UE 115 may execute a set of codes to control the functional elements of the device to perform the functions described below. Additionally or alternatively, the UE 115 may perform aspects of the functions described below using special-purpose hardware.

At block 1805 the UE 115 may identify a first mmW communication beam set to receive an SS. The operations of block 1805 may be performed according to the methods described with reference to FIGS. 1 through 4. In certain examples, aspects of the operations of block 1805 may be performed by a synchronization signal manager as described with reference to FIGS. 9 through 12.

At block 1810 the UE 115 may select a subarray to receive the SS from a subarray set, the selecting being based on a signal strength of the SS. The operations of block 1810 may be performed according to the methods described with reference to FIGS. 1 through 4. In certain examples, aspects of the operations of block 1810 may be performed by a synchronization signal manager as described with reference to FIGS. 9 through 12.

At block 1815 the UE 115 may identify a second mmW communication beam set to receive an RS based at least in part on the identified first mmW communication beam set to receive the SS, the second mmW communication beam set being associated with the first mmW communication beam set. The operations of block 1815 may be performed according to the methods described with reference to FIGS. 1 through 4. In certain examples, aspects of the operations of block 1815 may be performed by a UE communication beam manager as described with reference to FIGS. 9 through 12.

At block 1820 the UE 115 may receive the RS using the identified second mmW communication beam set. The operations of block 1820 may be performed according to the methods described with reference to FIGS. 1 through 4. In certain examples, aspects of the operations of block 1820 may be performed by a reference signal manager as described with reference to FIGS. 9 through 12.

In some examples, aspects from two or more of the methods 1200, 1300, 1400, 1500, 1600, or 1700 described with reference to FIG. 12, 13, 14, 15, 16, or 17 may be combined. It should be noted that the methods 1200, 1300, 1400, 1500, 1600, or 1700 are just example implementations, and that the operations of the methods 1200, 1300, 1400, 1500, 1600, or 1700 may be rearranged or otherwise modified such that other implementations are possible.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1X, 1X, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP Long Term Evolution (LTE) and LTE-Advanced (LTE-A) are releases of UMTS that use E-UTRA. UTRA, E-UTRA, UMTS, LTE, LTE-A, NR, and Global System for Mobile communications (GSM) are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects an LTE or an NR system may be described for purposes of example, and LTE or NR terminology may be used in much of the description, the techniques described herein are applicable beyond LTE or NR applications.

In LTE/LTE-A networks, including such networks described herein, the term evolved node B (eNB) may be generally used to describe the base stations. The wireless communications system or systems described herein may include a heterogeneous LTE/LTE-A or NR network in which different types of evolved node B (eNBs) provide coverage for various geographical regions. For example, each eNB, next generation NodeB (gNB) or base station may provide communication coverage for a macro cell, a small cell, or other types of cell. The term "cell" may be used to describe a base station, a carrier or component carrier associated with a base station, or a coverage area (e.g., sector) of a carrier or base station, depending on context.

Base stations may include or may be referred to by those skilled in the art as a base transceiver station, a radio base station, an access point, a radio transceiver, a NodeB, eNB, gNB, Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, gNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications, comprising:
    identifying a first millimeter wave (mmW) communication beam set to transmit a synchronization signal block (SSB) to a wireless device;
    transmitting the SSB using the identified first mmW communication beam set, the SSB comprising one or more synchronization signals and a broadcast channel;
    identifying one or more mmW communication beams to transmit a reference signal (RS) based at least in part on one or more antenna ports corresponding to the RS being quasi co-located with one or more antenna ports corresponding to the SSB, the one or more mmW communication beams being associated with corresponding mmW communication beams of the first mmW communication beam set; and transmitting the RS using the identified one or more mmW communication beams after transmitting the SSB.

2. The method of claim 1, wherein the first mmW communication beam set comprises the one or more mmW communication beams.

3. The method of claim 1, wherein the first mmW communication beam set is associated with a first parameter that is within a predetermined range of a second parameter of the one or more mmW communication beams.

4. The method of claim 1, further comprising:
determining that a transmit angle of one or more mmW communication beams of the first mmW communication beam set are similar to or identical to a transmit angle of at least some of the one or more mmW communication beams.

5. The method of claim 1, further comprising:
receiving, from a network entity, an indication of the one or more mmW communication beams to transmit the RS, wherein identifying the one or more mmW communication beams to transmit the RS is based at least in part on the received indication.

6. The method of claim 1, further comprising:
transmitting an indication of the one or more mmW communication beams to the wireless device.

7. The method of claim 1, wherein the first mmW communication beam set includes multiple mmW communication beams.

8. The method of claim 1, wherein the one or more mmW communication beams includes multiple mmW communication beams.

9. The method of claim 1, wherein the RS comprises a demodulation reference signal (DMRS) for a physical downlink shared channel.

10. A method for wireless communications, comprising:
identifying a first millimeter wave (mmW) communication beam set to receive a synchronization signal block (SSB) comprising one or more synchronization signals and a broadcast channel;
identifying one or more mmW communication beams to receive a reference signal (RS) based at least in part on a determination that one or more antenna ports corresponding to the RS are quasi co-located with one or more antenna ports corresponding to the SSB, the one or more mmW communication beams being associated with corresponding mmW communication beams of the first mmW communication beam set; and
receiving the RS using the identified one or more mmW communication beams after receiving the SSB.

11. The method of claim 10, further comprising:
receiving the SSB using the first mmW communication beam set.

12. The method of claim 10, wherein identifying the first mmW communication beam set to receive the SSB comprises:
determining whether a received signal strength of the first mmW communication beam set satisfies a threshold, or whether a signal strength of the first mmW communication beam set is greater than a signal strength of one or more candidate mmW communication beam sets, or a combination thereof.

13. The method of claim 10, wherein identifying the first mmW communication beam set to receive the SSB comprises:

selecting a subarray to receive the SS from a subarray set, the selecting being based at least in part on a signal strength of the SSB.

14. The method of claim 10, wherein identifying the one or more mmW communication beams comprises:
determining that the first mmW communication beam set comprises the one or more mmW communication beams.

15. The method of claim 10, wherein identifying the one or more mmW communication beams comprises:
determining that the corresponding mmW communication beams of the first mmW communication beam set are associated with a first parameter that is within a predetermined range of a second parameter of the one or more mmW communication beams.

16. The method of claim 10, further comprising:
performing a beam refinement procedure based at least in part on the identified one or more mmW communication beams.

17. The method of claim 16, further comprising:
receiving a subsequent SSB or a subsequent RS based at least in part on the identified one or more mmW communication beams and the beam refinement procedure.

18. An apparatus for wireless communications, in a system comprising:
a processor;
memory in electronic communication with the processor; and
instructions stored in the memory and operable, when executed by the processor, to cause the apparatus to:
identify a first millimeter wave (mmW) communication beam set to transmit a synchronization signal block (SSB) to a wireless device;
transmit the SSB using the identified first mmW communication beam set, the SSB comprising one or more synchronization signals and a broadcast channel;
identify one or more mmW communication beams to transmit a reference signal (RS) based at least in part on one or more antenna ports corresponding to the RS being quasi co-located with one or more antenna ports corresponding to the SSB, the one or more mmW communication beams being associated with corresponding mmW communication beams of the first mmW communication beam set; and
transmit the RS using the identified one or more mmW communication beams after transmitting the SSB.

19. The apparatus of claim 18, wherein the one or more mmW communication beams comprise the first mmW communication beam set.

20. The apparatus of claim 18, wherein the first mmW communication beam set is associated with a first parameter that is within a predetermined range of a second parameter of the one or more mmW communication beams.

21. The apparatus of claim 18, wherein the instructions are executable by the processor to:
determine that a transmit angle of one or more mmW communication beams of the first mmW communication beam set are similar to or identical to a transmit angle of at least some of the one or more mmW communication beams.

22. The apparatus of claim 18, wherein the instructions are executable by the processor to:
receive, from a network entity, an indication of the one or more mmW communication beams to transmit the RS, wherein identifying the one or more mmW communication beams to transmit the RS is based at least in part on the received indication.

23. The apparatus of claim 18, wherein the instructions are executable by the processor to:

transmit an indication of the one or more mmW communication beams to the wireless device.

24. An apparatus for wireless communications, in a system comprising:

a processor;

memory in electronic communication with the processor; and instructions stored in the memory and operable, when executed by the processor, to cause the apparatus to:

identify a first millimeter wave (mmW) communication beam set to receive a synchronization signal block (SSB) comprising one or more synchronization signals and a broadcast channel;

identify one or more mmW communication beams to receive a reference signal (RS) based at least in part on a determination that one or more antenna ports corresponding to the RS are quasi co-located with one or more antenna ports corresponding to the SSB, the one or more mmW communication beams being associated with corresponding mmW communication beams of the first mmW communication beam set; and receive the RS using the identified one or more mmW communication beams after receiving the SSB.

25. The apparatus of claim 24, wherein the instructions are executable by the processor to:

receive the SSB using the first mmW communication beam set.

26. The apparatus of claim 24, wherein the instructions to identify the first mmW communication beam set to receive the SSB comprises instructions to:

determine whether a received signal strength of the first mmW communication beam set satisfies a threshold, or whether a signal strength of the first mmW communication beam set is greater than a signal strength of one or more candidate mmW communication beam sets, or a combination thereof.

27. The apparatus of claim 24, wherein the instructions to identify the first mmW communication beam set to receive the SSB comprises instructions to:

select a subarray to receive the SSB from a subarray set, the selecting being based at least in part on a signal strength of the SSB.

* * * * *